(12) United States Patent
Mesdaq et al.

(10) Patent No.: US 10,601,865 B1
(45) Date of Patent: Mar. 24, 2020

(54) DETECTION OF CREDENTIAL SPEARPHISHING ATTACKS USING EMAIL ANALYSIS

(71) Applicant: FIREEYE, INC., Milpitas, CA (US)

(72) Inventors: Ali Mesdaq, San Jose, CA (US); Abhishek Singh, Milpitas, CA (US); Varun Jain, Milpitas, CA (US)

(73) Assignee: FireEye, Inc., Milpitas, CA (US)

( * ) Notice: Subject to any disclaimer, the term of this patent is extended or adjusted under 35 U.S.C. 154(b) by 448 days.

(21) Appl. No.: 14/872,016

(22) Filed: Sep. 30, 2015

(51) Int. Cl.
*H04L 29/06* (2006.01)
*H04L 12/58* (2006.01)
*G06F 16/955* (2019.01)

(52) U.S. Cl.
CPC ...... *H04L 63/1483* (2013.01); *G06F 16/9566* (2019.01); *H04L 51/046* (2013.01); *H04L 63/1425* (2013.01)

(58) Field of Classification Search
CPC .............. H04L 63/1483; H04L 51/046; H04L 63/1425; G06F 17/30887
See application file for complete search history.

(56) References Cited

U.S. PATENT DOCUMENTS

| | | |
|---|---|---|
| 4,292,580 A | 9/1981 | Ott et al. |
| 5,175,732 A | 12/1992 | Hendel et al. |
| 5,319,776 A | 6/1994 | Hile et al. |
| 5,440,723 A | 8/1995 | Arnold et al. |
| 5,490,249 A | 2/1996 | Miller |
| 5,657,473 A | 8/1997 | Killean et al. |
| 5,802,277 A | 9/1998 | Cowlard |
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

"Mining Specification of Malicious Behavior"—Jha et al, UCSB, Sep. 2007 https://www.cs.ucsb.edu/.about.chris/research/doc/esec07.sub.--mining_pdf-.

(Continued)

*Primary Examiner* — Techane Gergiso
(74) *Attorney, Agent, or Firm* — Rutan & Tucker, LLP

(57) ABSTRACT

A non-transitory computer readable storage medium having stored thereon instructions when executable by a processor perform operations including responsive to receiving an email including a URL, conducting an analysis of the email including: (i) analyzing a header and a body, and (ii) analyzing the URL; analyzing contents of a web page directed to by the URL; generating a score indicating a level of confidence the email is associated with a phishing attack based on at least one of the analysis of the email or the analysis of the contents of the web page; and responsive to the score being below a threshold, virtually processing the web page to determine whether the web page is associated with the phishing attack is shown.

20 Claims, 10 Drawing Sheets

(56) References Cited

U.S. PATENT DOCUMENTS

| | | | |
|---|---|---|---|
| 6,092,194 A | 7/2000 | Touboul | |
| 6,094,677 A | 7/2000 | Capek et al. | |
| 6,108,799 A | 8/2000 | Boulay et al. | |
| 6,154,844 A | 11/2000 | Touboul et al. | |
| 6,269,330 B1 | 7/2001 | Cidon et al. | |
| 6,272,641 B1 | 8/2001 | Ji | |
| 6,279,113 B1 | 8/2001 | Vaidya | |
| 6,298,445 B1 | 10/2001 | Shostack et al. | |
| 6,357,008 B1 | 3/2002 | Nachenberg | |
| 6,424,627 B1 | 7/2002 | Sørhaug et al. | |
| 6,442,696 B1 | 8/2002 | Wray et al. | |
| 6,484,315 B1 | 11/2002 | Ziese | |
| 6,487,666 B1 | 11/2002 | Shanklin et al. | |
| 6,493,756 B1 | 12/2002 | O'Brien et al. | |
| 6,550,012 B1 | 4/2003 | Villa et al. | |
| 6,775,657 B1 | 8/2004 | Baker | |
| 6,831,893 B1 | 12/2004 | Ben Nun et al. | |
| 6,832,367 B1 | 12/2004 | Choi et al. | |
| 6,895,550 B2 | 5/2005 | Kanchirayappa et al. | |
| 6,898,632 B2 | 5/2005 | Gordy et al. | |
| 6,907,396 B1 | 6/2005 | Muttik et al. | |
| 6,941,348 B2 | 9/2005 | Petry et al. | |
| 6,971,097 B1 | 11/2005 | Wallman | |
| 6,981,279 B1 | 12/2005 | Arnold et al. | |
| 7,007,107 B1 | 2/2006 | Ivchenko et al. | |
| 7,028,179 B2 | 4/2006 | Anderson et al. | |
| 7,043,757 B2 | 5/2006 | Hoefelmeyer et al. | |
| 7,058,822 B2 | 6/2006 | Edery et al. | |
| 7,069,316 B1 | 6/2006 | Gryaznov | |
| 7,080,407 B1 | 7/2006 | Zhao et al. | |
| 7,080,408 B1 | 7/2006 | Pak et al. | |
| 7,093,002 B2 | 8/2006 | Wolff et al. | |
| 7,093,239 B1 | 8/2006 | van der Made | |
| 7,096,498 B2 | 8/2006 | Judge | |
| 7,100,201 B2 | 8/2006 | Izatt | |
| 7,107,617 B2 | 9/2006 | Hursey et al. | |
| 7,159,149 B2 | 1/2007 | Spiegel et al. | |
| 7,213,260 B2 | 5/2007 | Judge | |
| 7,231,667 B2 | 6/2007 | Jordan | |
| 7,240,364 B1 | 7/2007 | Branscomb et al. | |
| 7,240,368 B1 | 7/2007 | Roesch et al. | |
| 7,243,371 B1 | 7/2007 | Kasper et al. | |
| 7,249,175 B1 | 7/2007 | Donaldson | |
| 7,287,278 B2 | 10/2007 | Liang | |
| 7,308,716 B2 | 12/2007 | Danford et al. | |
| 7,328,453 B2 | 2/2008 | Merkle, Jr. et al. | |
| 7,346,486 B2 | 3/2008 | Ivancic et al. | |
| 7,356,736 B2 | 4/2008 | Natvig | |
| 7,386,888 B2 | 6/2008 | Liang et al. | |
| 7,392,542 B2 | 6/2008 | Bucher | |
| 7,418,729 B2 | 8/2008 | Szor | |
| 7,428,300 B1 | 9/2008 | Drew et al. | |
| 7,441,272 B2 | 10/2008 | Durham et al. | |
| 7,448,084 B1 | 11/2008 | Apap et al. | |
| 7,458,098 B2 | 11/2008 | Judge et al. | |
| 7,464,404 B2 | 12/2008 | Carpenter et al. | |
| 7,464,407 B2 | 12/2008 | Nakae et al. | |
| 7,467,408 B1 | 12/2008 | O'Toole, Jr. | |
| 7,478,428 B1 | 1/2009 | Thomlinson | |
| 7,480,773 B1 | 1/2009 | Reed | |
| 7,487,543 B2 | 2/2009 | Arnold et al. | |
| 7,496,960 B1 | 2/2009 | Chen et al. | |
| 7,496,961 B2 | 2/2009 | Zimmer et al. | |
| 7,519,990 B1 | 4/2009 | Xie | |
| 7,523,493 B2 | 4/2009 | Liang et al. | |
| 7,530,104 B1 | 5/2009 | Thrower et al. | |
| 7,540,025 B2 | 5/2009 | Tzadikario | |
| 7,546,638 B2 | 6/2009 | Anderson et al. | |
| 7,565,550 B2 | 7/2009 | Liang et al. | |
| 7,568,233 B1 | 7/2009 | Szor et al. | |
| 7,584,455 B2 | 9/2009 | Ball | |
| 7,603,715 B2 | 10/2009 | Costa et al. | |
| 7,607,171 B1 | 10/2009 | Marsden et al. | |
| 7,639,714 B2 | 12/2009 | Stolfo et al. | |
| 7,644,441 B2 | 1/2010 | Schmid et al. | |
| 7,657,419 B2 | 2/2010 | van der Made | |
| 7,676,841 B2 | 3/2010 | Sobchuk et al. | |
| 7,698,548 B2 | 4/2010 | Shelest et al. | |
| 7,707,633 B2 | 4/2010 | Danford et al. | |
| 7,712,136 B2 | 5/2010 | Sprosts et al. | |
| 7,730,011 B1 | 6/2010 | Deninger et al. | |
| 7,739,740 B1 | 6/2010 | Nachenberg et al. | |
| 7,779,463 B2 | 8/2010 | Stolfo et al. | |
| 7,784,097 B1 | 8/2010 | Stolfo et al. | |
| 7,832,008 B1 | 11/2010 | Kraemer | |
| 7,836,502 B1 | 11/2010 | Zhao et al. | |
| 7,841,003 B1* | 11/2010 | Emdee | G06F 21/51 726/22 |
| 7,849,506 B1 | 12/2010 | Dansey et al. | |
| 7,854,007 B2 | 12/2010 | Sprosts et al. | |
| 7,869,073 B2 | 1/2011 | Oshima | |
| 7,877,803 B2 | 1/2011 | Enstone et al. | |
| 7,904,959 B2 | 3/2011 | Sidiroglou et al. | |
| 7,908,660 B2 | 3/2011 | Bahl | |
| 7,930,738 B1 | 4/2011 | Petersen | |
| 7,937,387 B2 | 5/2011 | Frazier et al. | |
| 7,937,761 B1 | 5/2011 | Bennett | |
| 7,949,849 B2 | 5/2011 | Lowe et al. | |
| 7,996,556 B2 | 8/2011 | Raghavan et al. | |
| 7,996,836 B1 | 8/2011 | McCorkendale et al. | |
| 7,996,904 B1 | 8/2011 | Chiueh et al. | |
| 7,996,905 B2 | 8/2011 | Arnold et al. | |
| 8,006,305 B2 | 8/2011 | Aziz | |
| 8,010,667 B2 | 8/2011 | Zhang et al. | |
| 8,020,206 B2 | 9/2011 | Hubbard et al. | |
| 8,028,338 B1 | 9/2011 | Schneider et al. | |
| 8,042,184 B1 | 10/2011 | Batenin | |
| 8,045,094 B2 | 10/2011 | Teragawa | |
| 8,045,458 B2 | 10/2011 | Alperovitch et al. | |
| 8,069,484 B2 | 11/2011 | McMillan et al. | |
| 8,087,086 B1 | 12/2011 | Lai et al. | |
| 8,171,553 B2 | 5/2012 | Aziz et al. | |
| 8,176,049 B2 | 5/2012 | Deninger et al. | |
| 8,176,480 B1 | 5/2012 | Spertus | |
| 8,201,246 B1 | 6/2012 | Wu et al. | |
| 8,204,984 B1 | 6/2012 | Aziz et al. | |
| 8,214,905 B1 | 7/2012 | Doukhvalov et al. | |
| 8,220,055 B1 | 7/2012 | Kennedy | |
| 8,225,288 B2 | 7/2012 | Miller et al. | |
| 8,225,373 B2 | 7/2012 | Kraemer | |
| 8,233,882 B2 | 7/2012 | Rogel | |
| 8,234,640 B1 | 7/2012 | Fitzgerald et al. | |
| 8,234,709 B2 | 7/2012 | Viljoen et al. | |
| 8,239,944 B1 | 8/2012 | Nachenberg et al. | |
| 8,254,538 B1* | 8/2012 | Watts | H04L 51/36 358/1.15 |
| 8,260,914 B1 | 9/2012 | Ranjan | |
| 8,266,091 B1 | 9/2012 | Gubin et al. | |
| 8,286,251 B2 | 10/2012 | Eker et al. | |
| 8,291,499 B2 | 10/2012 | Aziz et al. | |
| 8,307,435 B1 | 11/2012 | Mann et al. | |
| 8,307,443 B2 | 11/2012 | Wang et al. | |
| 8,312,545 B2 | 11/2012 | Tuvell et al. | |
| 8,321,936 B1 | 11/2012 | Green et al. | |
| 8,321,941 B2 | 11/2012 | Tuvell et al. | |
| 8,332,571 B1 | 12/2012 | Edwards, Sr. | |
| 8,352,738 B2 | 1/2013 | Parno et al. | |
| 8,365,286 B2 | 1/2013 | Poston | |
| 8,365,297 B1 | 1/2013 | Parshin et al. | |
| 8,370,938 B1 | 2/2013 | Daswani et al. | |
| 8,370,939 B2 | 2/2013 | Zaitsev et al. | |
| 8,375,444 B2 | 2/2013 | Aziz et al. | |
| 8,381,299 B2 | 2/2013 | Stolfo et al. | |
| 8,402,529 B1 | 3/2013 | Green et al. | |
| 8,464,340 B2 | 6/2013 | Ahn et al. | |
| 8,479,174 B2 | 7/2013 | Chiriac | |
| 8,479,276 B1 | 7/2013 | Vaystikh et al. | |
| 8,479,291 B1 | 7/2013 | Bodke | |
| 8,510,827 B1 | 8/2013 | Leake et al. | |
| 8,510,828 B1 | 8/2013 | Guo et al. | |
| 8,510,842 B2 | 8/2013 | Amit et al. | |
| 8,516,478 B1 | 8/2013 | Edwards et al. | |
| 8,516,590 B1 | 8/2013 | Ranadive et al. | |
| 8,516,593 B2 | 8/2013 | Aziz | |

(56) References Cited

U.S. PATENT DOCUMENTS

| | | | |
|---|---|---|---|
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,689,341 B1 * | 4/2014 | Hartmann | H04L 63/1483 713/188 |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,839,418 B2 * | 9/2014 | Hulten | G06F 17/30887 726/22 |
| 8,850,570 B1 | 9/2014 | Ramzan |
| 8,850,571 B2 | 9/2014 | Staniford et al. |
| 8,856,869 B1 * | 10/2014 | Brinskelle | G06F 21/6218 726/2 |
| 8,856,937 B1 * | 10/2014 | Wuest | H04L 63/1483 713/188 |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,065,725 B1 * | 6/2015 | Nanda | H04L 43/04 |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,154,514 B1 * | 10/2015 | Prakash | H04L 63/1483 |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,253,208 B1 * | 2/2016 | Koshelev | H04L 63/1483 |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,398,038 B2 * | 7/2016 | Higbee | H04L 63/1425 |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |

(56) References Cited

U.S. PATENT DOCUMENTS

| | | |
|---|---|---|
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,948,671 B2 * | 4/2018 | Perdisci ............... H04L 63/145 |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0200523 A1 * | 9/2006 | Tokuda ............... G06Q 10/107 709/206 |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |

(56) References Cited

U.S. PATENT DOCUMENTS

| | | |
|---|---|---|
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0118528 A1* | 5/2007 | Choi ............... H04L 51/12 |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192855 A1* | 8/2007 | Hulten ............ G06F 17/30887 726/22 |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2007/0294352 A1* | 12/2007 | Shraim ............. G06Q 10/107 709/206 |
| 2007/0299915 A1* | 12/2007 | Shraim ............. G06Q 10/107 709/206 |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0046970 A1* | 2/2008 | Oliver ............... G06F 21/554 726/3 |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0244070 A1* | 10/2008 | Kita ................. G06Q 10/00 709/225 |
| 2008/0263665 A1 | 10/2008 | Ma et al. |
| 2008/0288278 A1* | 11/2008 | Buss ................ G06Q 10/10 705/50 |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0006532 A1* | 1/2009 | Sinn ............... H04L 51/12 709/203 |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094677 A1* | 4/2009 | Pietraszek ......... H04L 29/12009 726/2 |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0088404 A1* | 4/2010 | Mani ............... H04L 67/125 709/224 |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |

(56) References Cited

U.S. PATENT DOCUMENTS

| | | |
|---|---|---|
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283035 A1 | 9/2014 | Sawhney et al. |
| 2014/0283037 A1 | 9/2014 | Sikorski et al. |
| 2014/0283063 A1 | 9/2014 | Thompson et al. |
| 2014/0298460 A1* | 10/2014 | Xue .............. H04L 63/1483 726/23 |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0180896 A1* | 6/2015 | Higbee .............. H04L 63/1416 726/25 |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0014151 A1* | 1/2016 | Prakash .............. H04L 63/1483 726/22 |
| 2016/0044000 A1 | 2/2016 | Cunningham |
| 2016/0044054 A1* | 2/2016 | Stiansen .............. H04L 63/1416 726/24 |
| 2016/0127393 A1 | 5/2016 | Aziz et al. |
| 2016/0156656 A1* | 6/2016 | Boggs .............. H04L 63/1433 726/25 |
| 2016/0191547 A1 | 6/2016 | Zafar et al. |
| 2016/0191550 A1 | 6/2016 | Ismael et al. |
| 2016/0226897 A1* | 8/2016 | Brown .............. G06F 21/554 |
| 2016/0248795 A1* | 8/2016 | Chien .............. H04L 63/1458 |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2016/0366164 A1* | 12/2016 | Cohen .............. G06F 16/285 |
| 2017/0083703 A1 | 3/2017 | Abbasi et al. |
| 2018/0013770 A1 | 1/2018 | Ismael |
| 2018/0048660 A1 | 2/2018 | Paithane et al. |
| 2018/0121316 A1 | 5/2018 | Ismael et al. |
| 2018/0288077 A1 | 10/2018 | Siddiqui et al. |

FOREIGN PATENT DOCUMENTS

| | | |
|---|---|---|
| WO | 02/23805 A2 | 3/2002 |
| WO | 0206928 | 11/2003 |
| WO | 2007117636 A2 | 10/2007 |
| WO | 2008041950 A2 | 4/2008 |
| WO | 2011084431 A2 | 7/2011 |
| WO | 2011/112348 A1 | 9/2011 |
| WO | 2012/075336 A1 | 6/2012 |
| WO | 2012145066 A1 | 10/2012 |
| WO | 2013/067505 A1 | 5/2013 |

OTHER PUBLICATIONS

"Network Security: NetDetector—Network Intrusion Forensic System (NIFS) Whitepaper", ("NetDetector Whitepaper"), (2003).

(56) References Cited

OTHER PUBLICATIONS

"Packet", Microsoft Computer Dictionary, Microsoft Press, (Mar. 2002), 1 page.
"When Virtual is Better Than Real", IEEEXplore Digital Library, available at, http://ieeexplore.ieee.org/xpl/articleDetails.isp?reload=true&arnumbe- r=990073, (Dec. 7, 2013).
Abdullah, et al., Visualizing Network Data for Intrusion Detection, 2005 IEEE Workshop on Information Assurance and Security, pp. 100-108.
Adetoye, Adedayo, et al., "Network Intrusion Detection & Response System", ("Adetoye"), (Sep. 2003).
AltaVista Advanced Search Results. "attack vector identifier". Http://www.altavista.com/web/results?Itag=ody&pg=aq&aqmode=aqa=Event+Orch- estrator . . . , (Accessed on Sep. 15, 2009).
AltaVista Advanced Search Results. "Event Orchestrator". Http://www.altavista.com/web/results?Itag=ody&pg=aq&aqmode=aqa=Event+Orch- esrator . . . , (Accessed on Sep. 3, 2009).
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.
Bayer, et al., "Dynamic Analysis of Malicious Code", J Comput Virol, Springer-Verlag, France., (2006), pp. 67-77.
Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).
Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cisco, Configuring the Catalyst Switched Port Analyzer (SPAN) ("Cisco"), (1992-2003).
Clark, John, Sylvian Leblanc,and Scott Knight. "Risks associated with usb hardware trojan devices used by insiders." Systems Conference (SysCon), 2011 IEEE International. IEEE, 2011.
Cohen, M.I. , "PyFlag—An advanced network forensic framework", Digital investigation 5, Elsevier, (2008), pp. S112-S120.
Costa, M. , et al., "Vigilante: End-to-End Containment of Internet Worms", SOSP '05, Association for Computing Machinery, Inc., Brighton U.K., (Oct. 23-26, 2005).
Crandall, J.R. , et al., "Minos:Control Data Attack Prevention Orthogonal to Memory Model", 37th International Symposium on Microarchitecture, Portland, Oregon, (Dec. 2004).
Deutsch, P. , "Zlib compressed data format specification version 3.3" RFC 1950, (1996).
Distler, "Malware Analysis: An Introduction", SANS Institute InfoSec Reading Room, SANS Institute, (2007).
Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
Excerpt regarding First Printing Date for Merike Kaeo, Designing Network Security ("Kaeo"), (2005).
Filiol, Eric , et al., "Combinatorial Optimisation of Worm Propagation on an Unknown Network", International Journal of Computer Science 2.2 (2007).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Gibler, Clint, et al. AndroidLeaks: automatically detecting potential privacy leaks in android applications on a large scale. Springer Berlin Heidelberg, 2012.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hjelmvik, Erik , "Passive Network Security Analysis with NetworkMiner", (IN)Secure, Issue 18, (Oct. 2008), pp. 1-100.
Idika et al., A-Survey-of-Malware-Detection-Techniques, Feb. 2, 2007, Department of Computer Science, Purdue University.
IEEE Xplore Digital Library Sear Results for "detection of unknown computer worms". Http//ieeexplore.ieee.org/searchresult.jsp?SortField=Score&SortOrder=desc- &ResultC . . . , (Accessed on Aug. 28, 2009).
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike , "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Kim, H. , et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King") (2003).
Krasnyansky, Max , et al., Universal TUN/TAP driver, available at https://www.kernel.org/doc/Documentation/networking/tuntap.txt (2002) ("Krasnyansky").
Kreibich, C. , et al., "Honeycomb—Creating Intrusion Detection Signatures Using Honeypots", 2nd Workshop on Hot Topics in Networks (HotNets-11), Boston, USA, (2003).
Kristoff, J. , "Botnets, Detection and Mitigation: DNS-Based Techniques", NU Security Day, (2005), 23 pages.
Leading Colleges Select FireEye to Stop Malware-Related Data Breaches, FireEye Inc., 2009.
Li et al., A VMM-Based System Call Interposition Framework for Program Monitoring, Dec. 2010, IEEE 16th International Conference on Parallel and Distributed Systems, pp. 706-711.
Liljenstam, Michael , et al., "Simulating Realistic Network Traffic for Worm Warning System Design and Testing", Institute for Security Technology studies, Dartmouth College ("Liljenstam"), (Oct. 27, 2003).
Lindorfer, Martina, Clemens Kolbitsch, and Paolo Milani Comparetti. "Detecting environment-sensitive malware." Recent Advances in Intrusion Detection. Springer Berlin Heidelberg, 2011.
Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurity12/sec12- -final107.pdf [retrieved on Dec. 15, 2014].
Marchette, David J., "Computer Intrusion Detection and Network Monitoring: A Statistical Viewpoint", ("Marchette"), (2001).

(56) References Cited

OTHER PUBLICATIONS

Margolis, P.E., "Random House Webster's 'Computer & Internet Dictionary 3rd Edition'", ISBN 0375703519, (Dec. 1998).

Moore, D., et al., "Internet Quarantine: Requirements for Containing Self-Propagating Code", INFOCOM, vol. 3, (Mar. 30-Apr. 3, 2003), pp. 1901-1910.

Morales, Jose A., et al., ""Analyzing and exploiting network behaviors of malware."", Security and Privacy in communication Networks. Springer Berlin Heidelberg, 2010. 20-34.

Mori, Detecting Unknown Computer Viruses, 2004, Springer-Verlag Berlin Heidelberg.

Natvig, Kurt, "SANDBOXII: Internet", Virus Bulletin Conference, ("Natvig"), (Sep. 2002).

NetBIOS Working Group. Protocol Standard for a NetBIOS Service on a TCP/UDP transport: Concepts and Methods. STD 19, RFC 1001, Mar. 1987.

Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).

Newsome, J., et al., "Polygraph: Automatically Generating Signatures for Polymorphic Worms", In Proceedings of the IEEE Symposium on Security and Privacy, (May 2005).

Nojiri, D., et al., "Cooperation Response Strategies for Large Scale Attack Mitigation", DARPA Information Survivability Conference and Exposition, vol. 1, (Apr. 22-24, 2003), pp. 293-302.

Oberheide et al., CloudAV.sub.--N-Version Antivirus in the Network Cloud, 17th USENIX Security Symposium USENIX Security '08 Jul. 28-Aug. 1, 2008 San Jose, CA.

Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").

Silicon Defense, "Worm Containment in the Internal Network", (Mar. 2003), pp. 1-25.

Singh, S., et al., "Automated Worm Fingerprinting", Proceedings of the ACM/USENIX Symposium on Operating System Design and Implementation, San Francisco, California, (Dec. 2004).

Spitzner, Lance, "Honeypots: Tracking Hackers", ("Spizner"), (Sep. 17, 2002).

The Sniffers's Guide to Raw Traffic available at: yuba.stanford.edu/.about.casado/pcap/section1.html, (Jan. 6, 2014).

Thomas H. Ptacek, and Timothy N. Newsham, "Insertion, Evasion, and Denial of Service: Eluding Network Intrusion Detection", Secure Networks, ("Ptacek"), (Jan. 1998).

U.S. Pat. No. 8,171,553 filed Apr. 20, 2006, Inter Parties Review Decision dated Jul. 10, 2015.

U.S. Pat. No. 8,291,499 filed Mar. 16, 2012, Inter Parties Review Decision dated Jul. 10, 2015.

Venezia, Paul, "NetDetector Captures Intrusions", InfoWorld Issue 27, ("Venezia"), (Jul. 14, 2003).

Wahid et al., Characterising the Evolution in Scanning Activity of Suspicious Hosts, Oct. 2009, Third International Conference on Network and System Security, pp. 344-350.

Whyte, et al., "DNS-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC conference, Las Vegas, NV, USA, (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.

Hiroshi Shinotsuka, Malware Authors Using New Techniques to Evade Automated Threat Analysis Systems, Oct. 26, 2012, http://www.symantec.com/connect/blogs/, pp. 1-4.

Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).

Lastline Labs, The Threat of Evasive Malware, Feb. 25, 2013, Lastline Labs, pp. 1-8.

Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).

\* cited by examiner

DETECTION OF CREDENTIAL SPEARPHISHING ATTACKS USING EMAIL ANALYSIS

FIELD

Embodiments of the disclosure relate to the field of cyber security. More specifically, embodiments of the disclosure relate to a system for credential spearphishing attacks, particularly those carried out via email.

GENERAL BACKGROUND

Over the last decade, malicious software has become a pervasive problem for Internet users as many networked resources include vulnerabilities that are subject to attack. In particular, persons looking to infiltrate a network or steal sensitive data have utilized a method known as phishing. Typically, a phishing attack comprises the transmission of an electronic communication, such as an email, to a broad group of recipients that purports to be from a known institution, such as a bank or credit card company, that seems to have a legitimate intention. For example, a malware writer may transmit an email to a large group of recipients purporting to be from a social media platform and asserting a password change is required for continued use of the platform. The email may have the look and feel of a legitimate email sent by the social media platform and include a Uniform Resource Locator (URL) that directs the recipients to a website requesting the recipient to enter credential information in order to change the recipient's password. The URL will not be associated with the social media platform, although it likely has the look and feel of the social media platform's website. The phishing attack is completed when the recipient of the email enters submits credential information to the website, which is then delivered to the malware writer. As used herein, the terms "link" and "URL" are used interchangeably.

As the efficacy of broad scale phishing attacks has decreased, malware writers have turned to a more personalized method, known as spearphishing, or credential spearphishing, attacks. Spearphishing is a more targeted version of phishing attacks that combines tactics such as victim segmentation, email personalization, sender impersonation, and other techniques to bypass email filters and trick targeted recipients into clicking a URL within the email, or opening an attachment attached thereto.

Spearphishers, malware writers that generate and transmit electronic communications that include spearphishing attacks, may use social engineering methods to personalize an email at a targeted recipient or small group of targeted recipients. For example, a spearphisher may extract information from social media platforms or a corporate website to craft an email that includes personalized information attempting to impersonate an institution relevant to the recipient, or small group of recipients, such as a bank, a credit card company or an employer. The spearphishing email may request that the recipient download an attachment or click on a URL. The attachment may contain malicious content, such as a malicious embedded object within a PDF document or Microsoft® Excel® file. The embedded object may comprise, for example, an exploit kit or other malicious payload that either installs malicious software or initiates malicious, anomalous or unwanted behavior (e.g., initiating a callback to a compromised server). The URL within a spearphishing email may direct the recipient of the email to a web page that imitates a legitimate institution claiming to need the recipient to provide credential information (e.g., login) in order to change a password, verify their identity, read an important notice, etc. Submission of credential information through such a web page merely provides the credential information to the spearphisher enabling the spearphisher to access sensitive information. An email that includes a URL directed to a web page that requests credential information may be referred to as a credential spearphishing attack.

These spearphishing attacks may be multi-vector, multi-stage attacks that current malware detection technology is unable to detect. For instance, the spearphishing attack may utilize email spoofing techniques to fool email filters. Additionally, spearphishing attacks may utilize zero-day (i.e., previously unknown) vulnerabilities in browsers or applications, use multi-vector, multi-vector attacks or dynamic URLs to bypass current malware detection systems. Additionally, as spearphishing attacks are personalized, they often lack characteristics typical of spam and therefore usually go undetected by traditional spam-filters.

Based on the problems presented by spearphishing attacks, and in particular, credential spearphishing attacks set forth above, current malware detection systems, including field-based sandbox detection systems contain numerous shortcomings and therefore fail to proactively detect spearphishing attacks. Credential spearphishing attacks may not include exploitation techniques but may instead rely on human interaction to input sensitive data into an input form (e.g., text box) and unknowingly submit that data to an unsecure server. The data may be passed to the unsecure server via an outbound POST request generated by the website on which a user is browsing. Therefore, credential spearphishing attacks present numerous detection challenges to current malware detection systems.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
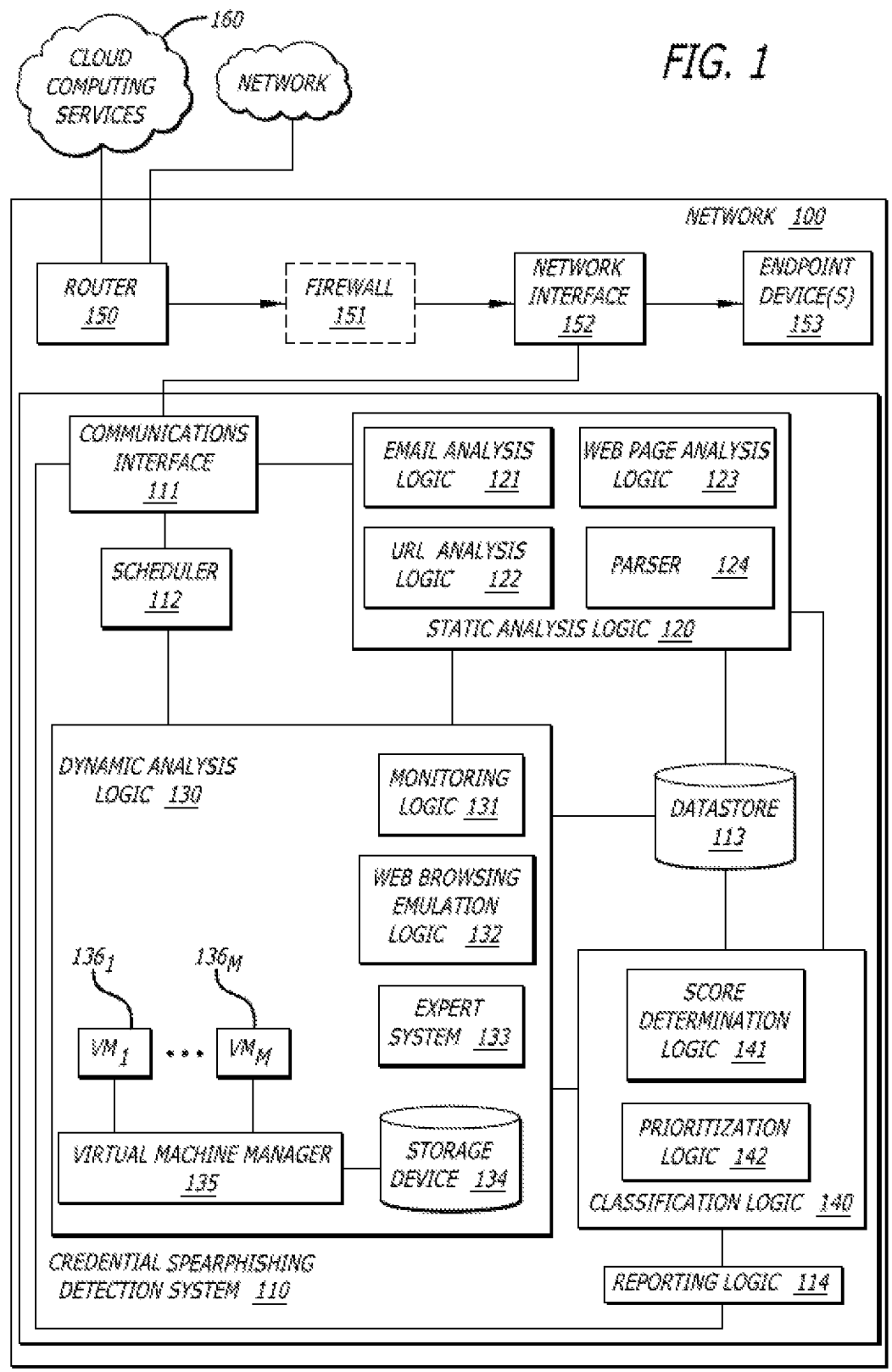
FIG. 1 is an exemplary block diagram of a credential spearphishing detection system 110 deployed inside an enterprise network 100.

Various embodiments of the disclosure relate to a spearphishing detection system that improves detection of spearphishing attacks, particularly, credential spearphishing attacks. Herein, a credential spearphishing attack may lead to the recipient of a credential spearphishing email mistakenly providing a spearphisher with credential information via a web page directed to by a URL within the credential spearphishing email. Additional or alternative embodiments may include a spearphishing detection system that detects spearphishing electronic communications that include attachments, the downloading of which may lead to the infection of an endpoint device with malware, wherein "malware" may be broadly construed as including exploits that initiate malicious, anomalous or unwanted behaviors.

In one embodiment of the disclosure, the credential spearphishing detection system includes a communication interface, a scheduler, a data store, a static analysis logic, a dynamic analysis logic, a classification logic, and a reporting logic.

The credential spearphishing detection system may capture network traffic addressed to one or more endpoint devices within a network (e.g., an enterprise network), for example Simple Mail Transfer Protocol (SMTP) traffic and analyze the SMTP traffic, e.g., an email, using the static analysis logic and/or the dynamic analysis logic. The static analysis logic includes (i) an email analysis logic that extracts and analyzes the header and body of the email, (ii) a URL analysis logic to extract and analyze a URL included within the email, and (iii) a web page analysis logic to fetch the HTML code of the web page corresponding to the URL, subsequently extract and analyze the header and body, including images contained therein, and determine whether the web page is attempting to impersonate (e.g., a victim domain). The dynamic analysis logic includes (a) at least one virtual machine (VM) to dynamically process the HTML source code of the web page to which the URL in the email directs, (b) a web browsing emulation logic to simulate human interaction within the web browser of the VM, and (c) an expert system to correlate the target domain with the victim domain and apply additional heuristics to determine if the web page is associated with spearphishing. One embodiment of a method of identifying the presence of a URL within an email message is described in a prior U.S. patent entitled "Electronic Message Analysis For Malware Detection," U.S. Pat. No. 9,106,694, which issued Aug. 11, 2015, the contents of which are incorporated herein by reference.

The credential spearphishing detection system may accumulate information about the victim domain (impersonated domain) and the target domain (domain of the spearphisher) during analysis by the static analysis logic. The credential spearphishing detection system may accumulate a sufficient amount of information during analysis by the static analysis logic such that a determination may be made that the email is associated with a spearphishing attack. Alternatively, or in addition, the information garnered during the static analysis may be provided to the dynamic analysis logic to aid in the configuration of one or more VMs. The VMs may then be used to process the web page directed to by the URL detected in the email.

A classification logic includes logic to prioritize the results of the analyses performed by the static analysis logic and/or the dynamic analysis logic to determine whether the email is associated with a phishing attack, or in particular, a spearphishing attack. In some embodiments, the score determination logic of the classification logic may generate a score indicating a level of confidence that the email is associated with a spearphishing attack. Herein, a score may be a numerical value; one of a predefined set of categories such as "suspicious," "malicious," or "benign"; an electrical signal such as '1' or '0', or the like. In one embodiment, an email may be determined to be associated with a spearphishing attack when a score meets or exceeds a predefined threshold. Alternatively, an email may be determined to be associated with a spearphishing attack when the classification logic classifies the email as "suspicious" and "malicious," or, possibly, just when classified as "malicious." Additionally, the classification logic may determine an email is associated with a phishing attack, or more particularly, a spearphishing attack based on one or more of the analyses performed. After any analysis, the score determination logic may determine a first score according to one or more analyses that is above a first threshold indicating a phishing attack (e.g., based on the presence of a domain in a detected URL known to be associated with a generic phishing attack) or a second score that is above a second threshold indicating a credential spearphishing attack (e.g., based on the presence of a domain in a detected URL known to be associated with a spearphishing attack and/or the presence of input forms on a web page requesting credential information).

A user of an endpoint that received, or was to receive, the email and/or a network administer may be alerted to the results of the processing via alert generated by a reporting logic. Such an alert may include various types of messages, which may include text messages and/or email messages, video or audio stream, or other types of information over a wired or wireless communication path. An alert may include an outline or summary of the phishing/spearphishing attack with which the email is associated. Additionally, when an email is determined to have been detected, the extracted characteristics of the email and the web page to which a URL directed may be stored in a data store and incorporated into future analyses by the credential spearphishing detection system. Furthermore, the extracted characteristics of an email determined to be associated with a spearphishing attack and the results of the corresponding processing may be uploaded to cloud computing services for use by other credential spearphishing detection systems.

As used herein, the transmission of data may take the form of transmission of electrical signals and/or electromagnetic radiation (e.g., radio waves, microwaves, ultraviolet (UV) waves, etc.).

I. Terminology

In the following description, certain terminology is used to describe features of the invention. For example, in certain situations, both terms "logic" and "engine" are representative of hardware, firmware and/or software that is configured to perform one or more functions. As hardware, logic (or engine) may include circuitry having data processing or storage functionality. Examples of such circuitry may include, but are not limited or restricted to a microprocessor, one or more processor cores, a programmable gate array, a microcontroller, a controller, an application specific integrated circuit, wireless receiver, transmitter and/or transceiver circuitry, semiconductor memory, or combinatorial logic.

Logic (or engine) may be software in the form of one or more software modules, such as executable code in the form of an executable application, an application programming interface (API), a subroutine, a function, a procedure, an applet, a servlet, a routine, source code, object code, a shared library/dynamic link library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

According to one embodiment, the term "malware" may be construed broadly as any code or activity that initiates a malicious attack and/or operations associated with anomalous or unwanted behavior. For instance, malware may correspond to a type of malicious computer code that executes an exploit to take advantage of a vulnerability, for example, to harm or co-opt operation of a network device or misappropriate, modify or delete data. Malware may also correspond to an exploit, namely information (e.g., executable code, data, command(s), etc.) that attempts to take advantage of a vulnerability in software and/or an action by a person gaining unauthorized access to one or more areas of a network device to cause the network device to experience undesirable or anomalous behaviors. The undesirable or anomalous behaviors may include a communication-based anomaly or an execution-based anomaly, which, for example, could (1) alter the functionality of an network device executing application software in an atypical manner (a file is opened by a first process where the file is configured to be opened by a second process and not the first process); (2) alter the functionality of the network device executing that application software without any malicious intent; and/or (3) provide unwanted functionality which may be generally acceptable in another context. Additionally, malware may be code that initiates unwanted behavior which may be, as one example, uploading a contact list from an endpoint device to cloud storage without receiving permission from the user.

The term "processing" may include launching an application wherein launching should be interpreted as placing the application in an open state and performing simulations of actions typical of human interactions with the application. For example, the application, an Internet browsing application may be processed such that the application is opened and actions such as visiting a website, scrolling the website page, and activating a link from the website are performed (e.g., the performance of simulated human interactions).

The term "network device" should be construed as any electronic device with the capability of connecting to a network, downloading and installing mobile applications. Such a network may be a public network such as the Internet or a private network such as a wireless data telecommunication network, wide area network, a type of local area network (LAN), or a combination of networks. Examples of a network device may include, but are not limited or restricted to, a laptop, a mobile phone, a tablet, etc. Herein, the terms "network device," "endpoint device," and "mobile device" will be used interchangeably. The terms "mobile application" and "application" should be interpreted as software developed to run specifically on a mobile network device.

The term "malicious" may represent a probability (or level of confidence) that the object is associated with a malicious attack or known vulnerability. For instance, the probability may be based, at least in part, on (i) pattern matches; (ii) analyzed deviations in messaging practices set forth in applicable communication protocols (e.g., HTTP, TCP, etc.) and/or proprietary document specifications (e.g., Adobe PDF document specification); (iii) analyzed compliance with certain message formats established for the protocol (e.g., out-of-order commands); (iv) analyzed header or payload parameters to determine compliance, (v) attempts to communicate with external servers during processing in one or more VMs, (vi) attempts to access memory allocated to the application during virtual processing, and/or other factors that may evidence unwanted or malicious activity.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

The invention may be utilized for detecting credential spearphishing attacks encountered as a result of receiving email. As this invention is susceptible to embodiments of many different forms, it is intended that the present disclosure is to be considered as an example of the principles of the invention and not intended to limit the invention to the specific embodiments shown and described.

II. General Architecture of a Credential Spearphishing Detection System

Referring to FIG. 1, an exemplary block diagram of a credential spearphishing detection system 110 deployed inside an enterprise network 100 is shown. In the embodiment illustrated, the enterprise network 100 includes the credential spearphishing detection system 110, a router 150, an optional firewall 151, a network switch 152, and the endpoint device(s) 153. The network 100 may include a public network such as the Internet, a private network (e.g., a local area network "LAN", wireless LAN, etc.), or a combination thereof. The router 150 serves to receive data, e.g., packets, transmitted via a wireless medium (e.g., a Wireless Local Area Network (WLAN) utilizing the Institute of Electrical and Electronics Engineers (IEEE) 802.11 standard) and/or a wired medium from the cloud computing services 160 and the endpoint devices 153. As is known in the art, the router 150 may provide access to the Internet for devices connected to the network 110.

In one embodiment, the network switch 152 may capture network traffic, make a copy of an email within the network traffic, pass the email to the appropriate endpoint devices 153 and pass the copy of the email to the exploit kit detection system 110. In a second embodiment, the network switch 152 may capture the email from the network traffic and pass the email to the credential spearphishing detection system 110 for processing prior to passing the email to the appropriate endpoint devices 153. In such an embodiment, the email will only be passed to the appropriate endpoint devices 153 if the analysis of the email does not indicate that the email is associated with a malicious attack, anomalous or unwanted behavior, or, in particular, a credential spearphishing attack.

The exploit kit detection system 110 includes a communication interface 111, a scheduler 112, a data store 113, a static analysis logic 120, a dynamic analysis logic 130, a classification logic 140, and a reporting logic 114.

As shown, the credential spearphishing detection system 110 is communicatively coupled with the cloud computing services 160, the Internet and one or more endpoint devices 153 via the communication interface 111, which directs at least a portion of the network traffic to the scheduler 112 and the static analysis logic 120.

The network traffic that is provided to the static analysis logic 120 by the communication interface 111 may include a portion of the received network traffic or the entirety of the network traffic. The parser 124 within the static analysis logic 120 parses the received network traffic and extracts SMTP traffic (e.g., an email) and provides the email to the email analysis logic 121. The email analysis logic 121 performs a first stage of analysis on the email which includes an analysis of the header and contents of the body of the email. The email is also provided to the URL analysis logic 121 which performs a second stage of analysis including parsing the email for a URL and upon detection of a URL, performing an analysis of the URL itself. Additionally, when a URL is detected, the email is provided to the web page analysis logic 123, which performs a third stage of analysis including fetching the web page content (e.g., HTML source code and associated metadata) and analyzing the header and body contents of the web page. In one embodiment, the analyses may be performed sequentially (e.g., email analysis, URL analysis, web page analysis) or one or more of the analyses may be performed concurrently (e.g., at least partially overlapping at the same time). In some embodiments, information and results of one analyses may be used to assist in other analyses. For example, information and results of the email analysis and/or the URL analysis may aid the web page analysis by providing the web page analysis logic 123 with the domain of the sender of the email and/or a domain of the URL (e.g., prior to one or more redirects), which may assist the web page analysis logic 123 in narrowing its analysis.

The dynamic analysis logic 130 may also be supplied with the email and the results of the analyses performed by the static analysis logic 120 in order to perform a fourth stage of analysis. The results and information related to the static analysis may be used to assist the dynamic analysis logic 130 in the processing of the email in one or more VMs. In one embodiment, the scheduler 112 may configure one or more of VM $136_1$-VM $136_M$ (M≥1) with selected software profiles. For instance, the results of the analyses by one or more of the email analysis logic 121, the URL analysis logic 122 and/or the web page analysis logic 123 may be used to determine which software images (e.g., application(s)) and/or operating systems to be fetched from the storage device 123 for configuring operability of the VM $136_1$-VM $136_M$. Herein, the VM $136_1$-VM $136_M$ may be provisioned with a guest image associated with a prescribed software profile. Each guest image may include a software application and/or an operating system (OS). Each guest image may further include one or more monitors, namely software components that are configured to observe and capture run-time behavior of an object under analysis during processing within the virtual machine.

Additionally, the results and information related to the static analysis may provide indications to the web browsing emulation logic 132 and the expert system 133 as to, inter alia, the domain of the sender of the email, the domain of the URL (e.g., the victim domain), suspicious text included in the email and/or the web page, etc. The static and dynamic analyses will be discussed below in further detail.

The classification logic 140 includes the score determination logic 141 and the prioritization logic 142 and receives the results and information related to the static analysis and the dynamic analysis. The prioritization logic 142 may be configured to associate weighting with one or more portions of the analyses. The score determination logic 141 determines a score indicative of the likelihood the email is associated with a phishing, or more particularly, a spearphishing attack. The score determination logic 141 may determine a first score indicating the likelihood that the email is associated with a phishing attack based on an analysis of the email (e.g., header and body) and a URL detected within the email. The score determination logic 141 may determine a second score indicating the likelihood that the web page directed to by the URL in the email, and thus the email, is associated with a phishing attack based on an analysis of web page itself. Additionally, the score determination logic 141 may determine a third score indicating the likelihood that the email is associated with a phishing attack based on a dynamic analysis of web page directed to by the URL in the email as well as the information collected during the static analysis, including the first and second score.

When the first, second or third score indicates that the email is above a first, second or threshold predetermined threshold level, respectively, the email, and optionally the information collected during the static and/or dynamic analyses as well as the respective results, may be provided to a network administrator. In such a situation, when the email has not yet been provided to an endpoint device(s) 153, the email will not be provided to the endpoint device(s) 153. In the situation in which the email has been provided, an alert may be generated by the reporting logic 114 and transmitted to the endpoint device(s) 153 alerting the user of the phishing, or in particular, a spearphishing, attack.

When the first, second and third scores determined by the score determination logic 141 do not rise above one or more predetermined thresholds (i.e., the email is not associated with a phishing attack), the email is passed to the endpoint device(s) 153, if it had not previously been done.

The reporting logic 114 is adapted to receive information from the static analysis logic 120 and the dynamic analysis logic 130 and generate alerts that identify to a user of an endpoint device 153, network administrator or an expert network analyst the likelihood that an email is associated with a spearphishing attack. Other additional information regarding the analysis may optionally be included in the alerts.

Figure 2:
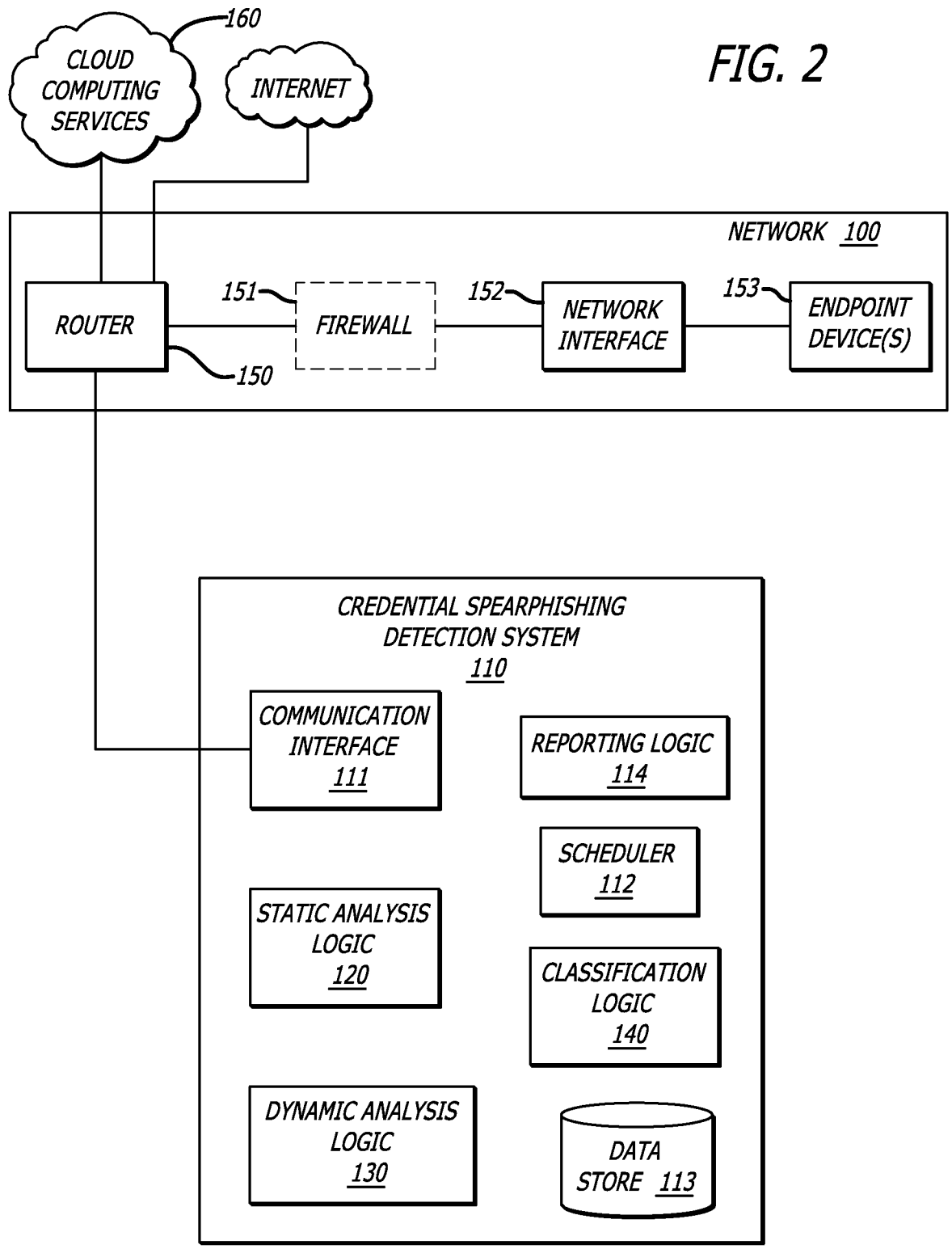
FIG. 2 is an exemplary block diagram of the credential spearphishing detection system 110 deployed outside of the enterprise network 100.

Referring to FIG. 2, an exemplary block diagram of the credential spearphishing detection system 110 deployed outside of the enterprise network 100 is shown. In such an embodiment, network traffic received by the network 100 may be captured by the network switch 152, a copy generated by the network switch 152 and the copy provided to the credential spearphishing detection system 110 via the router 150. This embodiment may illustrate a situation in which the credential spearphishing detection system 110 is not located at the same location as the location covered by the network 100.

Figure 3:
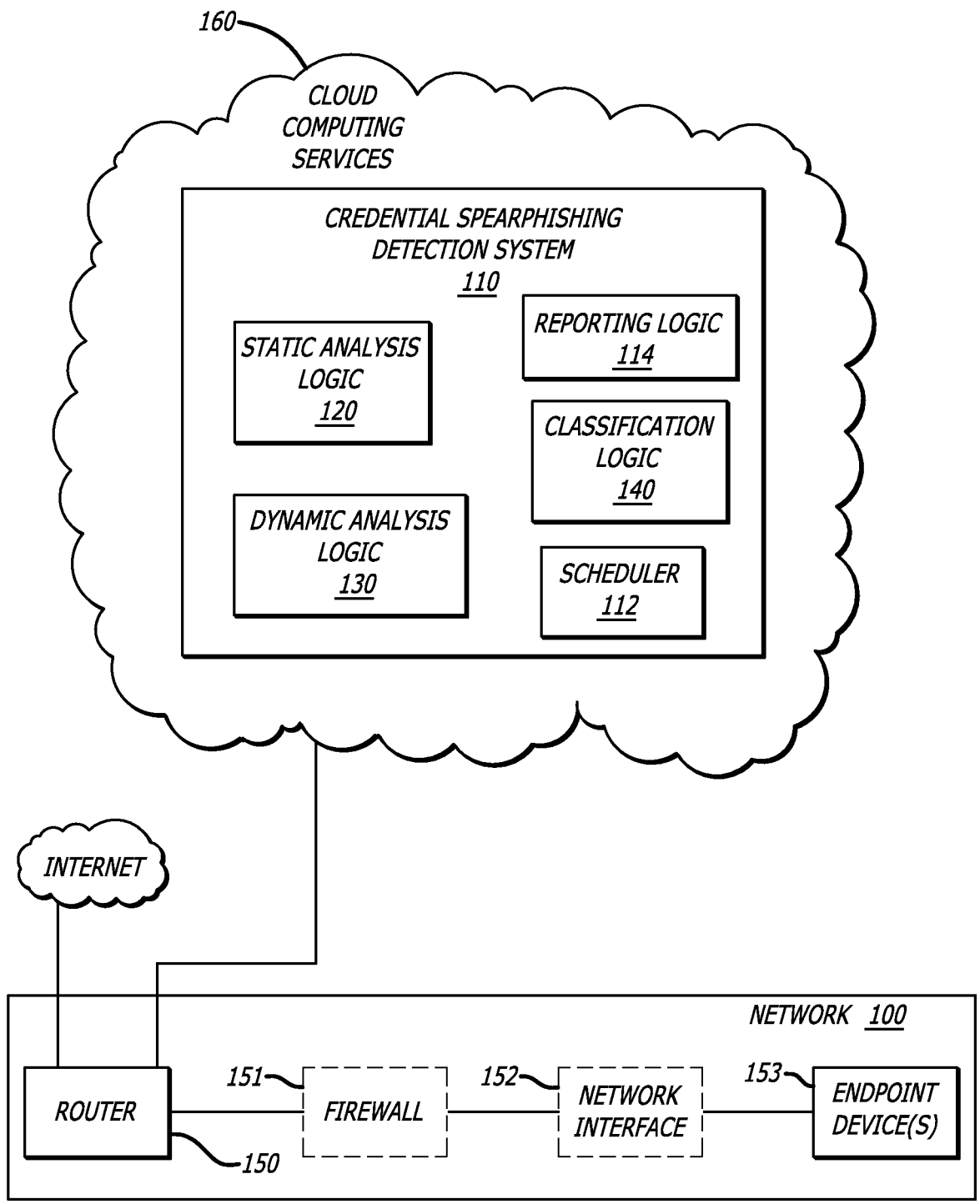
FIG. 3 is an exemplary block diagram of the credential spearphishing detection system 110 deployed within cloud computing services 160.

Referring to FIG. 3, an exemplary block diagram of the credential spearphishing detection system 110 deployed within cloud computing services 160 is shown. As with FIGS. 1 and 2, network traffic received by the network 100 may be captured by the network switch 152, a copy generated by the network switch 152 and the copy provided to the credential spearphishing detection system 110 via the router 150.

Figure 4:
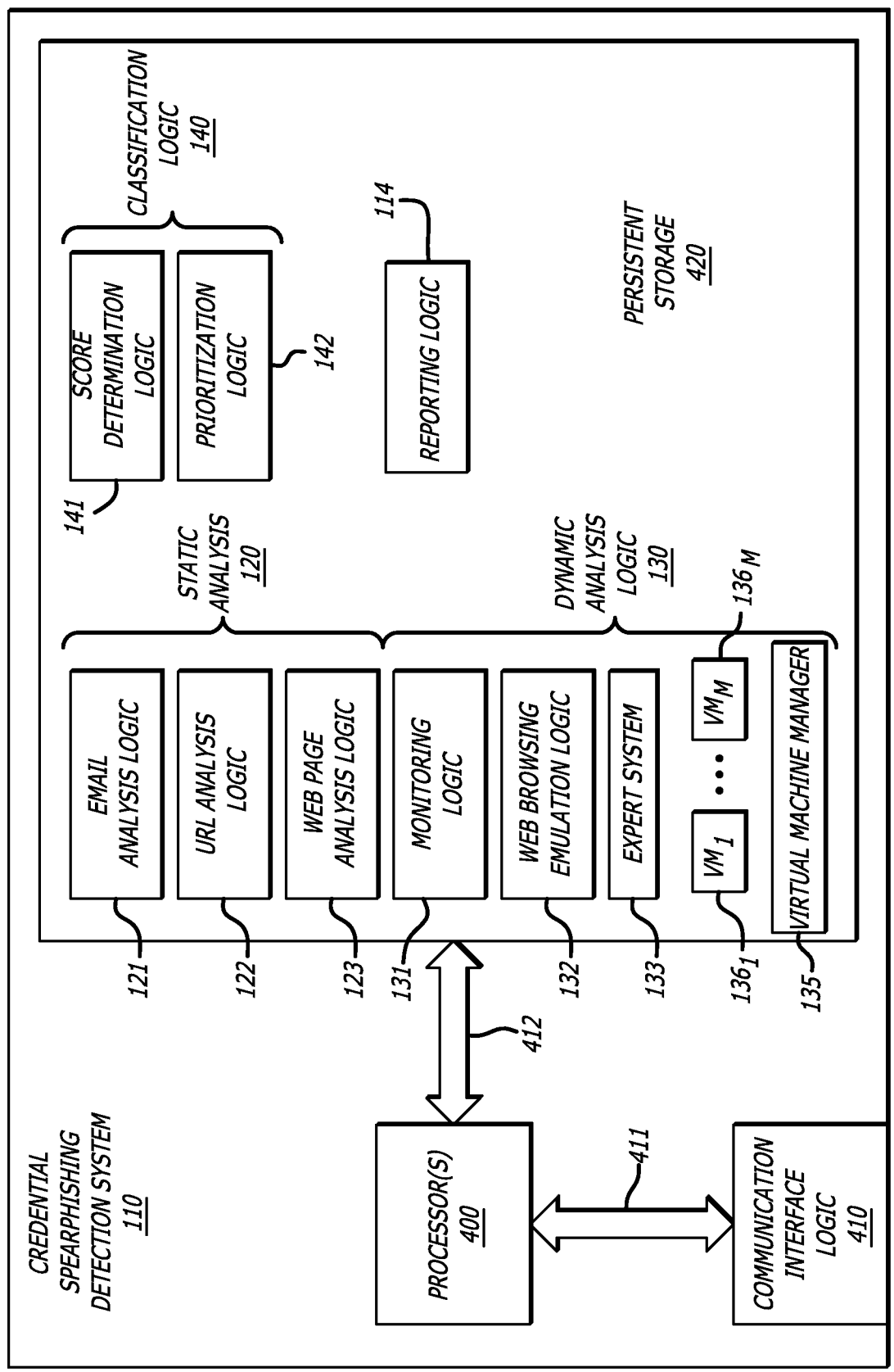
FIG. 4 is an exemplary embodiment of a logical representation of the credential spearphishing detection system 110 of FIG. 1.

Referring to FIG. 4, an exemplary embodiment of a logical representation of the credential spearphishing detection system 110 of FIGS. 1-3 is shown. The credential spearphishing detection system 110 includes one or more processors 400 that are coupled to communication interface logic 410 via a first transmission medium 411. Communication interface logic 410 enables communication with network devices via the Internet, the cloud computing services 160 and the endpoint devices 153. According to one embodiment of the disclosure, communication interface logic 410 may be implemented as a physical interface including one or more ports for wired connectors. Additionally, or in the alternative, communication interface logic 410 may be implemented with one or more radio units for supporting wireless communications with other electronic devices.

Processor(s) 400 is further coupled to persistent storage 420 via a second transmission medium 412. According to one embodiment of the disclosure, persistent storage 420 may include (a) the static analysis logic 120 including the email analysis logic 121, the URL analysis logic 122 and the web page analysis logic 123; (b) the dynamic analysis logic 130 including the monitoring logic 131, the web browsing emulation logic 132, the expert system 133, the VMs $136_1$-$136_M$ and the VMM 135; and (c) the classification logic 140 including the score determination logic 141 and the prioritization logic 142. Of course, when implemented as hardware, one or more of these logic units could be implemented separately from each other.

III. Stages of Credential Spearphishing Analysis

The overall analysis performed by the credential spearphishing detection system 110 may be broken down into multiple stages: (i) email analysis, (ii) URL analysis, (iii) web page analysis, and (iv) dynamic analysis including web page emulation. As was discussed above, although the overall analysis is discussed herein in terms of "stages," the overall analysis should not be limited to a specific sequential order. In contrast, the stages illustrate one embodiment of the analyses such that portions of the overall analysis may proceed in alternative orders than as discussed below. Additionally, one or more portions of the overall analysis may be performed concurrently with at least part of the portions of the overall analysis overlapping in time.

Figure 5:
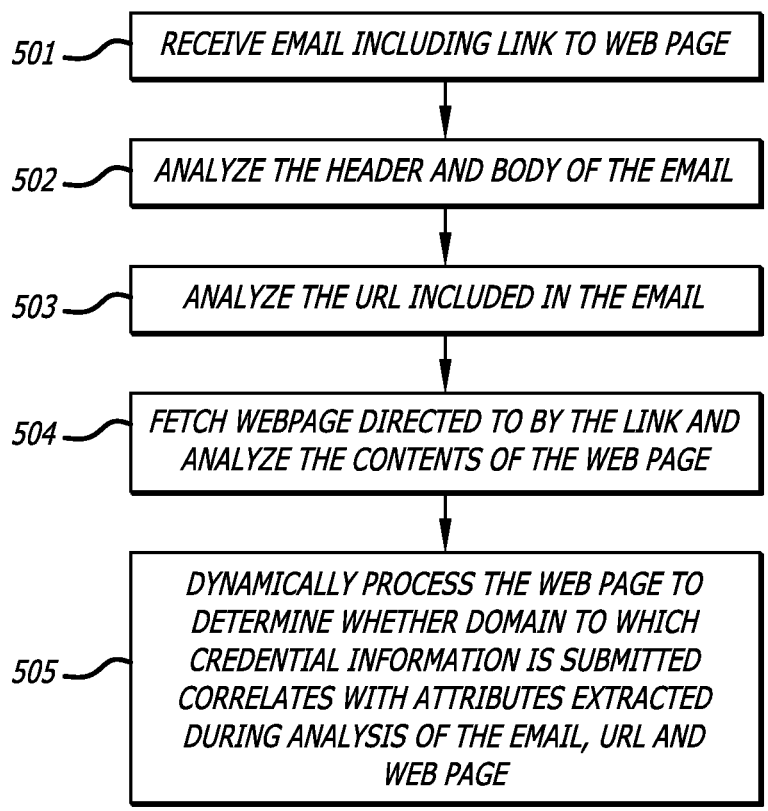
FIG. 5 is a flowchart illustrating an exemplary method for detecting a credential spearphishing attack through analysis of an email and associated links with the credential spearphishing detection system 110 of FIG. 1.

Referring to FIG. 5, a flowchart illustrating an exemplary method for detecting a credential spearphishing attack through analysis of an email and an associated URL with the credential spearphishing detection system of FIG. 1 is shown. Each block illustrated in FIG. 5 represents an operation performed in the method 500 of detecting a credential spearphishing attack in an email and associated links found within the email. Referring to FIG. 5, an email is received by the credential spearphishing detection system that includes a URL to a web page (block 501). At block 502, the header and body of the email are analyzed. An email analysis logic included within a static analysis logic of the credential spearphishing detection system may perform an analysis of the header (e.g., correlating the domain of the sender of the email with a blacklist of domains known to be associated with spearphishing attacks).

At block 503, the URL included within the email is analyzed. The URL analysis may be performed by the URL analysis logic included within the static analysis logic, which may include a correlation of the domain directed to by the URL with a blacklist of known domains known to be associated with spearphishing attacks. For example, a domain that may easily be mistaken for a well-known and respected institution (e.g., "www.bankofamerca.com") may be included on such a blacklist.

At block 504, an analysis of the web page directed to by the URL included in the email is conducted by fetching the web page (e.g., requesting the HTML source code associated with the URL) and analyzing the contents of the web page. The analysis of the web page is performed by the web page analysis logic included within the static analysis logic. The analysis of the web page may include, inter alia, (i) a correlation of the attributes of the HTTP response header and/or the HTTP response body with one or more blacklists of attributes known to be associated with spearphishing attacks, and/or (ii) the application of heuristic, probabilistic and/or machine learning algorithms to the attributes of the HTTP response header and/or the HTTP response body.

At block 505, the email may be processed within a virtual machine included in a dynamic analysis logic of the credential spearphishing detection system. Herein, a web browser emulation logic of the dynamic analysis logic provides credential information and submits the credential information in order to generate a POST request. The attributes of the POST request are then correlated with the victim domain (e.g., the domain indicated in the email and/or web page as the domain to which the credential information will purportedly be provided). Additionally, the information extracted during virtual processing may be correlated with the information and attributes extracted during static analysis.

The specific stages included within the overall analysis illustrated by method 500 in FIG. 5 will be discussed in further detail below in FIGS. 6-8.

1. Stages 1 and 2: Email Analysis and URL Analysis

Figure 6:
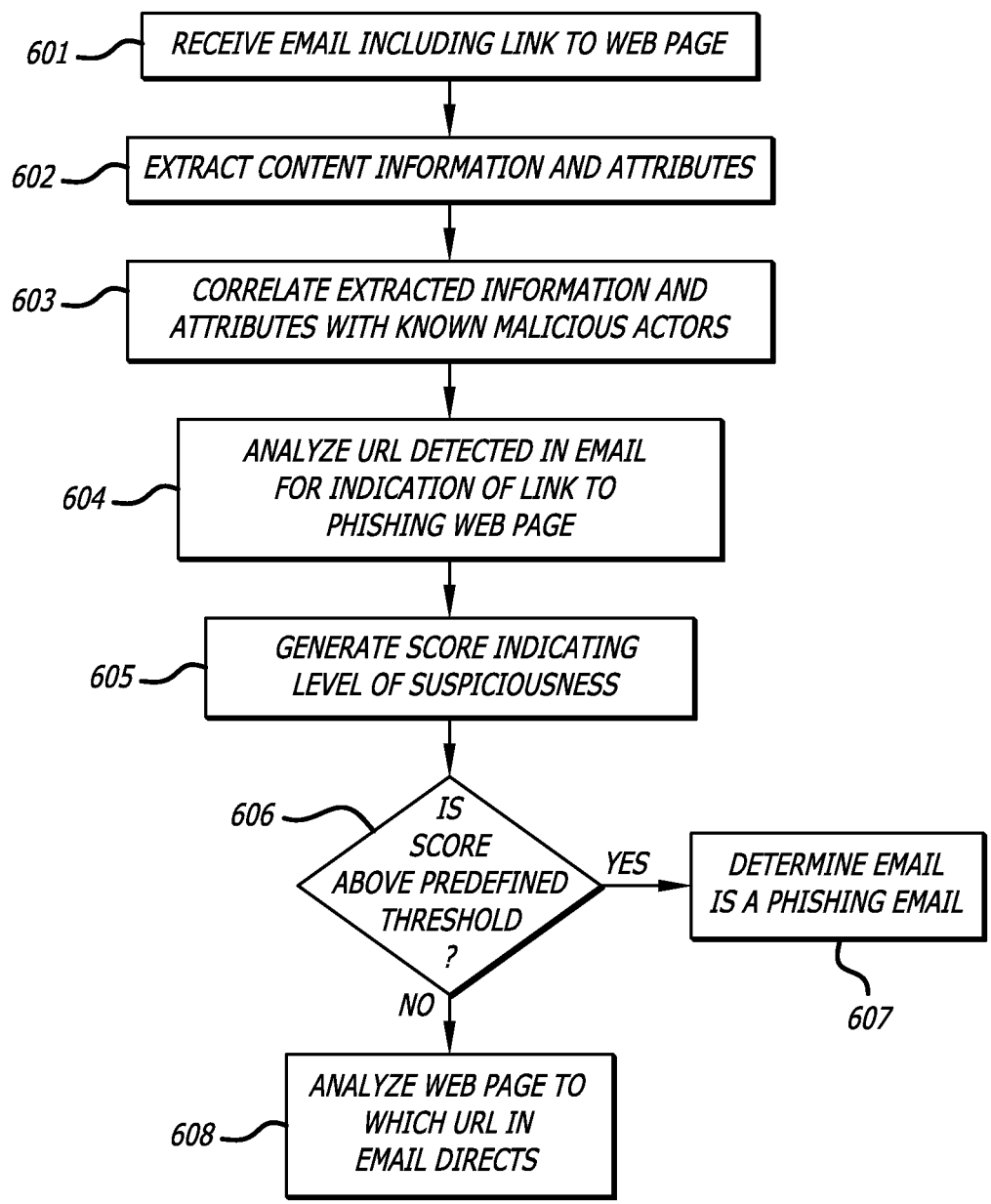
FIG. 6 is a flowchart illustrating an exemplary method for analyzing an email with the credential spearphishing detection system 110 of FIG. 1.

Referring now to FIG. 6, a flowchart illustrating an exemplary method for analyzing an email with the credential spearphishing detection system 110 of FIG. 1 is shown. Each block illustrated in FIG. 6 represents an operation performed in the method 600 of analyzing a content information and attributes, the body and one or more URLs included in an email with the credential spearphishing detection system 110. In the particular embodiment illustrated in FIG. 6, blocks 602 and 603 highlight at least a portion of the email analysis described as stage 1 above and blocks 602 and 604 highlight at least a portion of the URL analysis described as stage 2 above.

At block 601, an email is received by the credential spearphishing detection system that includes a URL to a web page. At block 602, the content information and attributes of the email are extracted. Herein, the content information may refer to the contents of the body of the email and include, but is not limited or restricted to, one or more URLs detected within the email, one or more input forms (e.g., text boxes, radio buttons, drop down menus, etc.) detected within the email, the location of URLs detected within the email, and/or text and/or images detected within the email. It should be noted that the content information may be displayed or may be "hidden" (e.g., white text located on a white background, text located behind an image, text positioned off-screen, text having a font size of '0' and/or a link comprising a single character—e.g., a hyphen—within a paragraph of text). Additionally, header attributes may include, inter alia, the "from" address, the subject, and/or the "reply to" address.

At block 603, the extracted information and attributes are correlated with known malicious actors. Herein, a database, stored in for example, a data store, may include a representation of known malicious actors corresponding to one or more of the extracted content information elements and/or the header attributes. The correlation may determine whether a match occurs between extracted content information and/or header attributes and one or more known malicious actors. Additionally, the correlation may include a determination as to the percentage of the occurrence of a match in order to account for a mutation (e.g., a minor change to an element of a component of content information or a header attribute—for example, one letter changes in the "from" address). In such a situation, the correlation may determine a match exists when a similarity occurs above a predetermined percentage threshold.

At block 604, a URL detected in the email is analyzed for indications that the URL is associated with a phishing attack. The analysis of the URL detected in the email may include, but is not limited or restricted to, a determination of the existence of a typographical error in the URL according to URL's of well-known institutions or well-known web pages (e.g., predefined URLs), a correlation between the domain of the URL and extracted content information and/or header attributes, and/or a correlation between the domain and a subdomain of the URL. In one example, the email analysis may extract the "reply to" address from the header of the email and determine the email is coming from a well-known banking institution based on the content of the text located in the email. Additionally, the URL analysis may extract domain and subdomain information of a URL detected in the email.

At block 605, a score indicating a level of suspiciousness is generated. Subsequent to the email analysis and URL analysis (e.g., blocks 602-604), the results of the analysis are provided to the classification logic. The classification logic of the credential spearphishing detection system may prioritize the extractions and determinations that occurred during the email analysis and the URL analysis and determine a score. For example, if the "reply to" address in the header and the subdomain of the detected URL match but neither match the well-known banking institution portrayed by the content of the email, a score may be determined that indicates the email is likely associated with a spearphishing attack.

At block 606, a determination is made as to whether the score is above a first predefined threshold. As discussed above, the score determined by the classification logic, e.g., the score determination logic, may indicate the email is likely associated with a spearphishing attack by being above a first predetermined threshold. Alternatively, as is discussed previously herein, the score may not necessarily be a numerical score.

When the score is determined to be above the first predefined threshold (yes at block 606), the email is determined to be a phishing email (block 607). In one embodiment, the score may indicate that the email is likely associated with a phishing email (e.g., the "reply to" address and/or the subject line contents match malicious actors known to be associated with phishing attacks) or the score may indicate that the email is likely associated with a spearphishing attack. In one embodiment, a first score may indicate a phishing attack and a second score, being higher than the first score, may indicate a spearphishing attack.

When the score is not determined to be above the first predefined threshold (no at block 606), the web page directed to by the URL detected within the email is analyzed (block 608). The analysis of the web page is detailed below in association with FIG. 7.

2. Stage 3: Web Page Analysis

Figure 7:
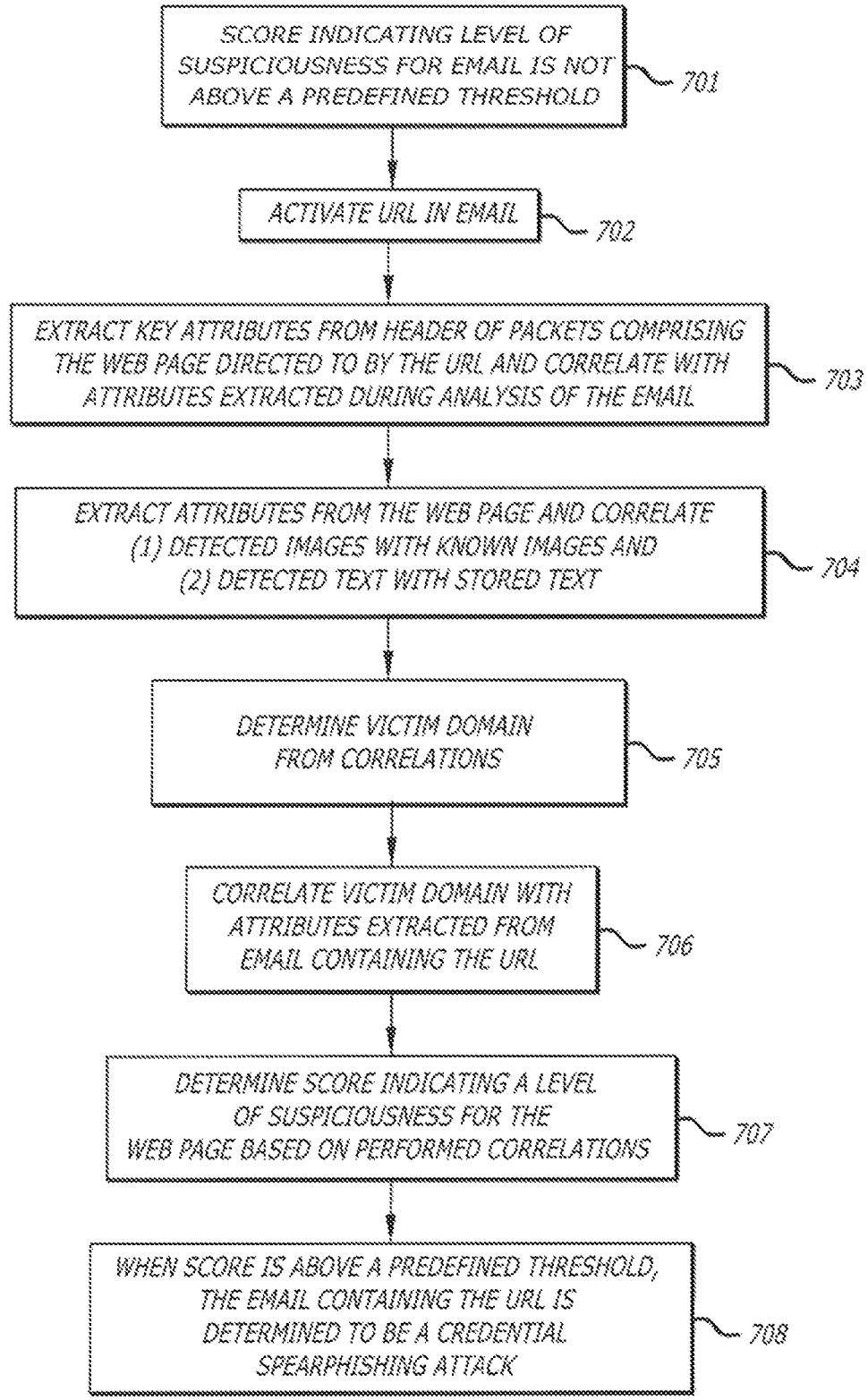
FIG. 7 is a flowchart illustrating an exemplary method for analyzing a web page directed to by a URL in an email with the credential spearphishing detection system 110 of FIG. 1.

Referring to FIG. 7, a flowchart illustrating an exemplary method for analyzing a web page directed to by a URL in an email with the credential spearphishing detection system of FIG. 1 is shown. In one embodiment, as will be discussed herein, method 700 is performed subsequent to method 600 of FIG. 6. Therefore, the discussion of FIG. 7 will often refer to one or more portions of FIG. 6. Each block illustrated in FIG. 7 represents an operation performed in the method 700 of activating a URL included in an email and analyzing the web page directed to by the URL with the credential spearphishing detection system. At block 701, the credential spearphishing detection system has determined that a score associated with the suspiciousness of the email is not above a first predefined threshold.

At block 702, the URL, detected during parsing and/or analysis of the header and body contents of the email is activated. Herein, by activating the URL, the web page analysis logic of the spearphishing credential detection system initiates a request for the HTML source code corresponding to the URL.

At block 703, key attributes are extracted from the header of the packets comprising the web page directed to by the URL. Examples of key attributes that may be extracted include, but are not limited or restricted to, information indicating the server delivering the web page, the metadata of the server (e.g., whether the server runs as a Linux® or Windows® platform, the location hosting the domain, the length of time the domain has been hosted, etc.), and/or the use of a secure connection. Subsequent to extraction, the key attributes of the headers are correlated with attributes extracted during analysis of the email. The web page analysis logic may correlate the attributes extracted from the headers of the fetched web page with the attributes extracted from the email to determine the consistency between the sources. For example, if the attributes extracted from the email do not match the attributes extracted from the headers of the fetched web page, the email may have a high likelihood of being associated with a phishing attack.

At block 704, attributes from the web page body are extracted. Following extraction, one or more of the following correlations may be performed: (1) a correlation between the images detected on the web page and images of well-known institutions and companies (e.g., logos of banks, credit card companies, stores) and/or (2) a correlation between the text detected on the web page and stored text known to be associated with well-known institutions and companies (e.g., names or slogans). These correlations may be referred to as a "screen shot analysis." The correlations of the attributes from the web page body result in a determination of the institution or company the web page is portraying (e.g., in the case of a phishing email, attempting to impersonate). During extraction, the presence of hidden links may be recorded as well.

In some embodiments, the screen shot analysis may include a correlation of the extracted content (e.g., title, text content, input forms, the location of each, etc.) with the one or more entries within a database wherein each entry represents the attributes of web pages previously determined to be associated with phishing attacks. For example, attributes of web pages previously determined to be associated with a phishing attack may be stored in a data store and compared to the extracted attributes of the web page. Therefore, the screen shot analysis may also provide a determination as to how closely the web page directed to by the URL matches a web page known to be associated with a phishing attack. Additionally, machine learning techniques may be applied such that when a web page directed to by a URL in an email is determined to be associated with a phishing attack, the extracted attributes may be added to the data store for future analyses.

At block 705, the correlations performed in blocks 703 and 704 are used to determine a victim domain. The victim domain, as discussed above, is the domain the web page is attempting to impersonate. For example, the correlation of the images detected on the web page may indicate that the web page is attempting to portray a well-known institution such as Bank of America (e.g., the Bank of America logo was detected on the web page).

At block 706, the victim domain is correlated with the attributes extracted from the email. Herein, once the victim domain has been determined, the consistency between the victim domain and the attributes extracted during the analysis of the email (e.g., header, body, detected URLs, etc.). For example, a correlation revealing that the email portrayed a first company but the victim domain portrayed a second company different than the first company may indicate a high likelihood that the email is associated with a phishing attack.

At block 707, a score indicating a level of suspiciousness for the web page (e.g., the likelihood of association with a phishing attack) is generated based on one or more of the correlations performed in blocks 703, 704 and/or 706. At block 708, when the score is above a second predefined threshold, the email is determined to be associated with a credential spearphishing attack.

Alternatively, or in addition, the score indicating the level of suspiciousness of the web page may be combined with the scores generated as a result of the analyses of the email and the URL detected in the email, as discussed with FIG. 6.

3. Stage 4: Dynamic Analysis

Figure 8:
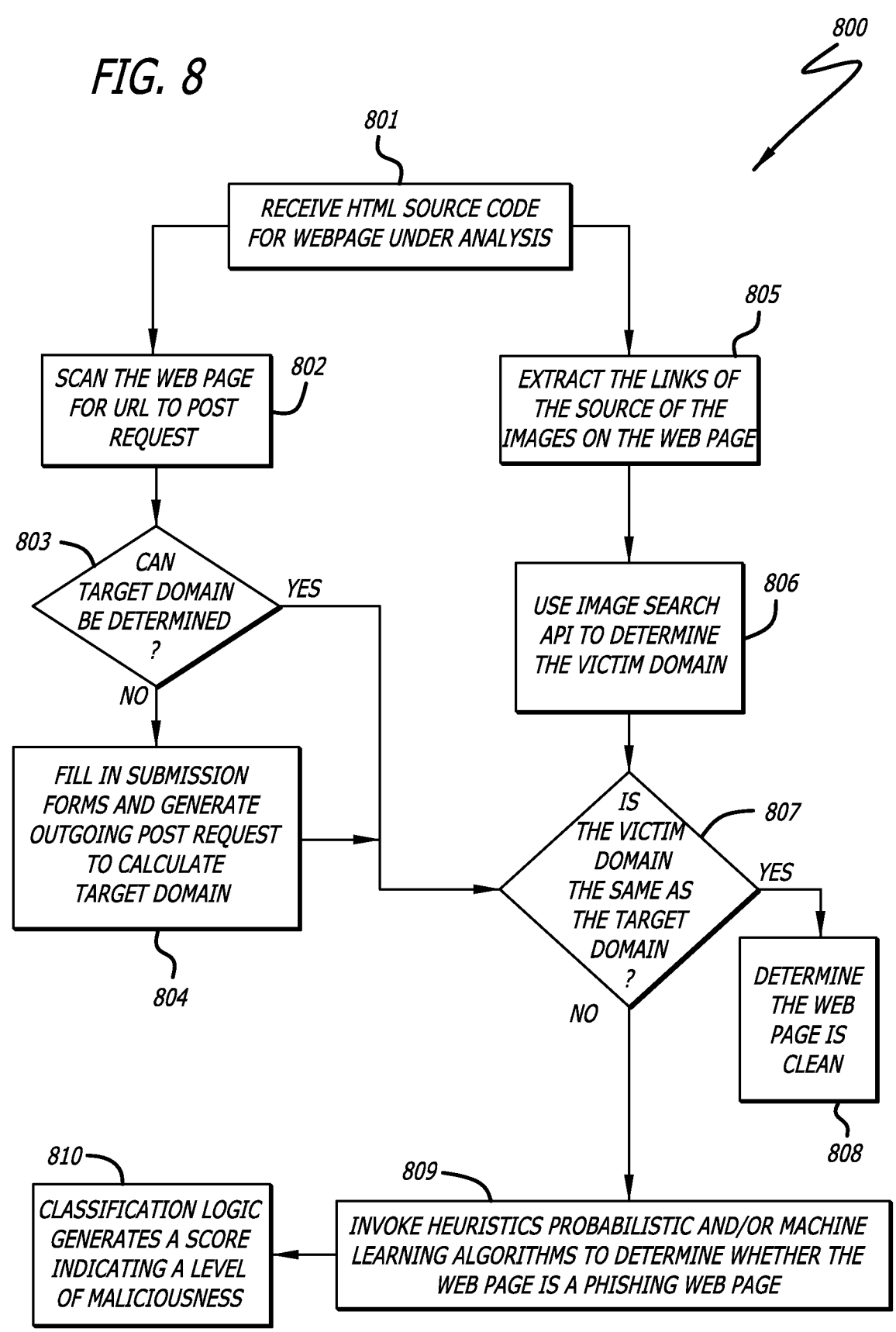
FIG. 8 is a flowchart illustrating an exemplary method for dynamically processing the HTML source code of a web page directed to by a URL in an email with the credential spearphishing detection system 110 of FIG. 1.

Referring to FIG. 8, a flowchart illustrating an exemplary method for virtually processing the HTML source code of a web page directed to by a URL in an email with the credential spearphishing detection system 110 of FIG. 1 is shown. Each block illustrated in FIG. 8 represents an operation performed in the method 800 of analyzing a web page directed to by a URL included in an email with the dynamic analysis logic 130 credential spearphishing detection system.

When referring to method 800, the information extracted and collected by the static analysis logic within the credential spearphishing detection system should be kept in mind. The static analysis logic is communicatively coupled to the dynamic analysis logic such that information extracted and collected during static analysis, as well as results of that analysis may be provided to the dynamic analysis engine to assist in the dynamic analysis.

At block 801, the dynamic analysis logic receives the HTML source code for the web page directed to by the URL in the email. Previously, as is discussed in methods 600 and 700 of FIGS. 6 and 7, (i) a score indicating a level of suspiciousness as to whether the email is associated with a phishing, or particularly, a spearphishing attack based on an analysis of the header and contents of the email and a URL included in the email, and (ii) a score indicating a level of suspiciousness as to whether the web page is associated with a spearphishing attack based on a static analysis of the header and contents of the body of the web page as set forth in the HTML source code of the web page.

At block 802, the web page is scanned for input fields that submit data to an external server via a request method supported by the Hypertext Transfer Protocol (HTTP), which may be, for example, a HTTP POST request. Herein, the analysis may look to detect a POST request as a POST request requests that a web server accepts data enclosed in the request payload. By detecting a POST request, the web browser emulation logic may detect a domain to which the contents of the one or more input fields will be submitted from the link associated with the submission button (hereinafter referred to as the "target domain"). However, in one embodiment, the domain may be obfuscated and not discernible from the link associated with the submission button. In such an embodiment, the obfuscated content will be de-obfuscated by the web browsing emulation logic. Following the de-obfuscation of the content, the web browsing emulation logic may detect a POST request. In other embodiments, a HTTP GET request may be detected and the URL associated with the GET request may be analyzed to determine a target domain.

At block 803, a determination is made as to whether the target domain can be determined based on the detected POST request as set forth in the HTML source code. When the target domain cannot yet be determined from the HTML source code (no at block 803), the input fields are loaded with content and an outgoing POST request is generated upon submission of the contents via the link corresponding to a submission button associated with the input fields (block 804). Herein, the web browsing emulation logic captures the POST request generated by the web browser in the VM. The web browsing emulation logic parses the captured POST request to determine the domain to which the contents of the input fields are being transmitted (e.g., the target domain).

As blocks 802-804 of the method 800 are being performed, blocks 805 and 806 may also be performed concurrently. At block 805, the links to each image detected on the web page are extracted from the HTML source code by the web browser emulation logic. For example, the extraction of the link to an image may be a result of the detection of the HTML syntax: <img src="url">. Once the links to each image detected on the web page have been extracted, the web browsing emulation logic utilizes an image search API (e.g., Image Search API, a Custom Search API, optical character recognition techniques (OCR), comparison of the image pointed to by the extracted link with images stored in a database) to determine, for each detected image, images similar to the detected image (block 806). The image search API is also used to determine the links to each image. The web browsing emulation logic determines the reputation of each link (e.g., the image search API results may be provided in order of highest to lowest reputation) and sets the domain of the highest ranking link corresponds to the domain the web page is attempting to portray (e.g., the victim domain). In one embodiment, a rank of an image may correspond to the placement of the image in the list of results ordered according to reputation. The reputation may be decided by the search image search API and based on the image host's index within the image search API, global popularity as established by the image search API, etc. The domain may be obtained by parsing and analyzing the result properties of each image within the results (e.g., the field labeled "originalContextUrl" within a result of an image from an image search using an Image Search API or a Custom Search API returns the URL of the page containing the image, other fields provided similar information such as the raw URL (non-alphanumeric characters only) or an encoded URL).

When multiple images are detected, the web browsing emulation logic prioritizes each image (e.g., may be by location of the image) and sets the domain of the highest ranked image as the victim domain. A correlation may be performed between the images wherein, in one embodiment, when a plurality of images are associated with one domain, that domain is set as the victim domain.

Blocks 805 and 806 illustrate one option for determining the victim domain. As an alternative method for determining the victim domain, the web page analysis logic of the static analysis logic may determine the victim domain (see blocks 704 and 705 of FIG. 7).

When the target domain and victim domain have been determined, a determination is made as to whether the victim domain is the same as the target domain (block 807). In one embodiment, when the target domain is the same as the victim domain (yes at block 807), the classification logic may determine that the web page is not associated with a phishing, and in particular a spearphishing, attack (block 808). In other embodiments, the results of the static analysis may also be taken into account via the prioritization logic and the score determination logic.

When the target domain and the victim domain are not the same (no at block 807), the expert system of the dynamic analysis logic is invoked to perform additional heuristics on the web page to determine whether the web page is associated with a phishing web page, and thus the email associated with a phishing attack (block 809). Examples of additional heuristics that may aid in the determination of a score, as discussed below, may include but are not limited or restricted to, the presence, or lack thereof, of: a redirection from a secured website ("HTTPS") to an unsecured website ("HTTP") or vice versa; POST request via HTTP or HTTPS; Captcha (a type of challenge-response test used in computing to determine whether or not the user is human), etc.

Upon applying additional heuristics to the extracted attributes of the web page, the classification logic receives the results and information related to the static analysis and the dynamic analysis. The prioritization logic may be configured to associate weighting with one or more portions of the analyses and provide the weighting to the score determination logic. The score determination generates a third score, as mentioned above, indicating the likelihood the web page, and thus, the email, is associated with a phishing, or more particularly, a spearphishing attack. The third score may be based on one or more of (i) the virtual processing of the web page, (ii) the analysis of the email (e.g., header and body), (iii) the analysis of the URL detected within the email, and/or (iv) the analysis of the fetched web page.

In some embodiments, the third score may indicate a level of confidence that the email is associated with a spearphishing attack. As discussed above, the third score may be a numerical value; one of a predefined set of categories such as "suspicious," "malicious," or "benign"; an electrical signal such as '1' or '0', or the like. In one embodiment, the email may be determined to be associated with a spearphishing attack when the third score meets or exceeds a predefined threshold. Alternatively, the email may be determined to be associated with a spearphishing attack when the classification logic classifies the email as "suspicious" and "malicious," or, possibly, just when classified as "malicious."

IV. Example Illustration of a Credential Spearphishing Attack

Figure 9:
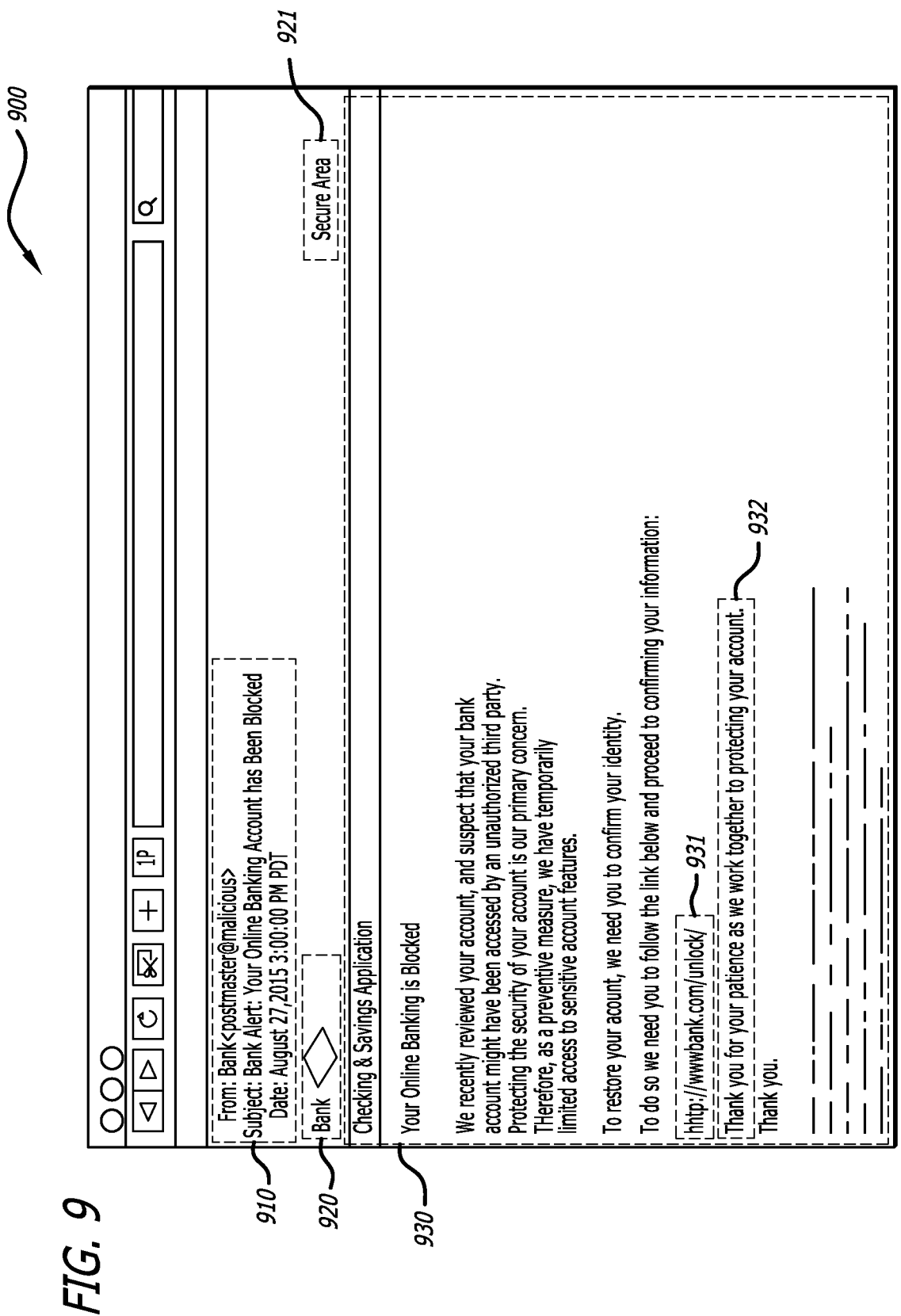
FIG. 9 is a block diagram illustrating an exemplary email associated with a credential spearphishing attack.

Referring to FIG. 9, a block diagram illustrating an exemplary email associated with a credential spearphishing attack is shown. The email 900 illustrates an example of a spearphishing email that may be received by the credential spearphishing detection system of FIG. 1. Display area 910 illustrates a display of a portion of the email header. As illustrated, the typical portions of the email header displayed to a recipient are shown, including information detailing the sender of the email, the subject of the email and the date of transmission. The full email header, or alternatively referred to as the raw header, may include numerous attributes including, but not limited or restricted to: return-path, x-spamcatcher-score; received from, by and with; date, message-ID; date; user-agent; x-accept-language; mime-version; to; from; subject; content-type; and/or content-transfer. Icon 920 illustrates an example icon for "Bank" as well as the location an icon may be placed to impersonate an email from a legitimate bank. Text 921 may present to further the impersonation of an email from the legitimate bank.

Display area 930 comprises the body of the email and may include text that impersonates an email from a legitimate bank, and may even copy the text directly from an email from the legitimate bank. Display area 930 may include URL 931 and text 932. URL 931, as discussed above, may redirect to a credential spearphishing web page. Text 932 is highlighted as an example of a typographical error, which may be used by the credential spearphishing detection system to indicate an association with a credential spearphishing attack (e.g., " . . . as we work together to protecting your account.").

Figure 10:
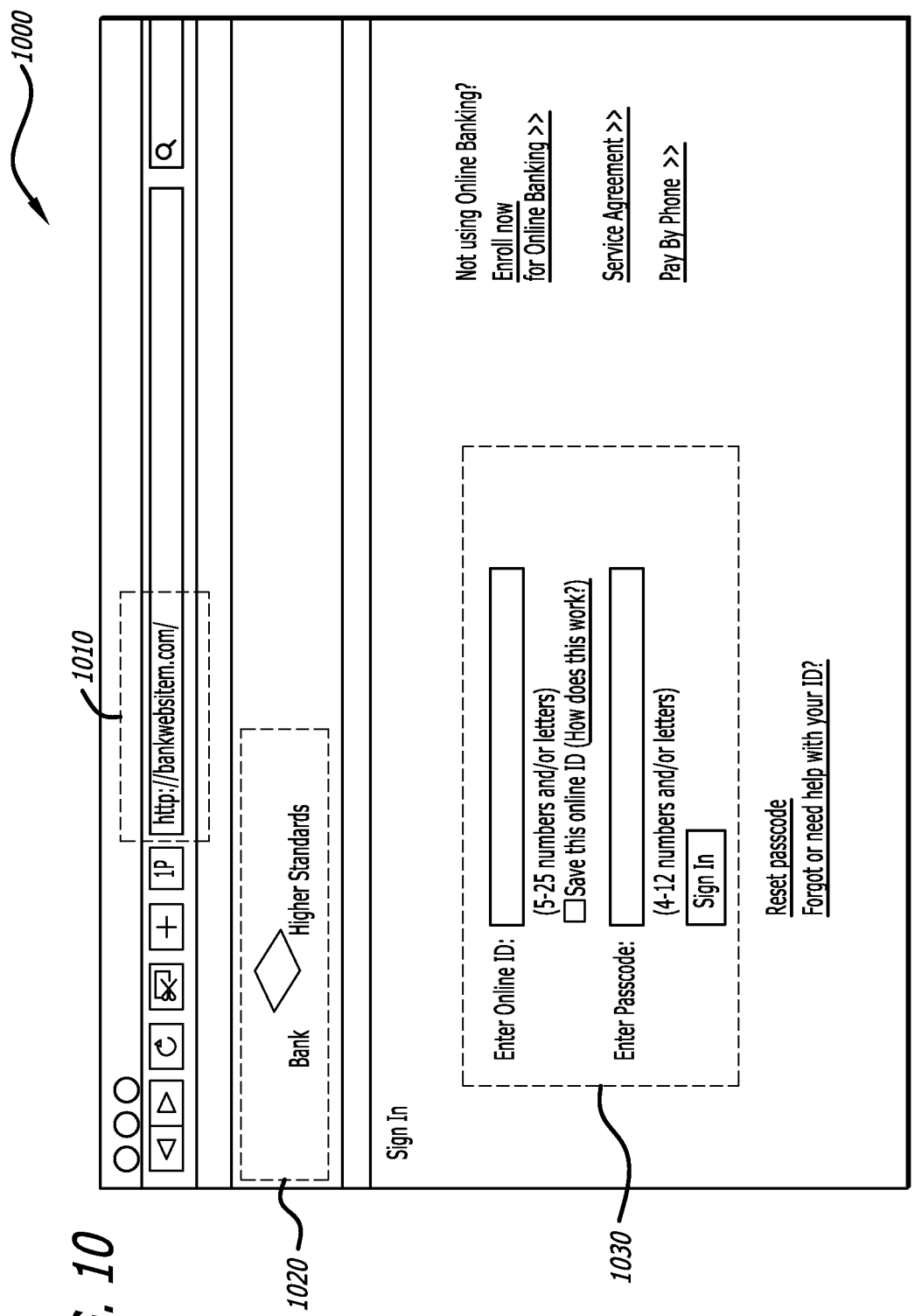
FIG. 10 is a block diagram illustrating an exemplary web page associated with a credential spearphishing attack.

Referring to FIG. 10, a block diagram illustrating an exemplary web page associated with a credential spearphishing attack is shown. The web page 1000 illustrates an example of a spearphishing web page that may be directed to by a URL included in an email received by the credential spearphishing detection system of FIG. 1. The address bar 1010 illustrates a typical address bar that displays the URL of the web page 1000. At first glance, the URL seems legitimate but "bankwebsitem" is likely an attempt to impersonate "bankwebsite." The credential spearphishing detection system will analyze the URL during, for example, stage 2 as discussed above.

The icon 1020 may be included on the web page 1000 to aid in the impersonation of the legitimate bank. The icon 1020 may be a copy of the logo used by the legitimate bank. The icon 1020 will be analyzed by the credential spearphishing detection system during, for example, stages 3 and/or 4 as discussed above.

The display area 1030 includes a plurality of input forms for submitting credential information (e.g., online ID and passcode). The presence of input forms may be taken into account when determining the suspiciousness of the web page 1000 during, for example, stage 3 as discussed above. Additionally, the web browsing emulation logic may analyze the POST request generated by submission of content into the input form during the virtual processing of the web page 1000.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A non-transitory computer readable storage medium having stored thereon instructions, the instructions being executable by one or more processors to perform operations including:
   responsive to receiving an email including a Uniform Resource Locator (URL), conducting a static analysis of the email including:
      (i) analyzing a header and a body of the email, and
      (ii) analyzing the URL included in the email;
   processing, within a virtual machine, the email by (i) providing, within the virtual machine, credential information to a web page directed to by the URL thereby generating a POST request, (ii) determining attributes of the POST request, and (iii) correlating the attributes of the POST request with a domain indicated by information included in the body of the email;
   generating a first score indicating a first level of confidence indicating that the email is associated with a phishing attack based on the processing of the email within the virtual machine; and
   responsive to the first score being below a first threshold, determining the email is associated with the phishing attack.

2. The computer readable storage medium of claim 1 further comprising:
   generating a second score representing a second level of confidence indicating the email is associated with the phishing attack based on (i) the processing of the web page and (ii) at least one of the analysis of the email or the analysis of the contents of the web page.

3. The computer readable storage medium of claim 2, wherein the phishing attack is a credential spearphishing attack.

4. The computer readable storage medium of claim 1, wherein the analyzing of the header of the email includes extracting key attributes and correlating the extracted key attributes with known malicious actors, and
   the analysis of the body of the email includes extracting and correlating at least one of one or more input forms, a location of the URL, text or an image detected in the body of the email with attributes known to be associated with a phishing attack.

5. The computer readable storage medium of claim 1, wherein the analyzing of the URL includes at least one of a determination of an existence of a typographical error in the URL compared to predefined URLs, a correlation between a domain of the URL and content information or header attributes of the email, or a correlation between the domain and a subdomain of the URL.

6. The computer readable storage medium of claim 1, wherein the analyzing of the contents of the web page includes extracting and correlating at least one of a server delivering the web page, metadata of the server, or whether a secure connection is used to deliver the email with one or more attributes extracted from the header or body of the email.

7. The computer readable storage medium of claim 1, wherein subsequent to detecting an image of the web page during processing of the email, the static analysis further includes performing a correlation between the image detected on the web page with one or more stored images of predetermined companies.

8. The computer readable storage medium of claim 1, wherein the processing of the web page includes processing HyperText Markup Language (HTML) source code of the web page in one or more virtual machines, wherein the one or more virtual machines are configured based on at least one of the analysis of the email or the analysis of the contents of the web page.

9. The computer readable storage medium of claim 8, wherein the processing in the one or more virtual machines includes (i) generating a POST request by submitting data in one or more input fields of the web page and recording the generated POST request, and (ii) determining a first domain to which the POST request was being transmitted.

10. The computer readable storage medium of claim 9, wherein the HTML source code is included within obfuscated network traffic and, prior to processing the HTML source, the obfuscated network traffic is deobfuscated.

11. An apparatus for detecting an association of an email with a phishing attack, the apparatus comprising:
    one or more processors;
    a storage device communicatively coupled to the one or more processors and having logic stored thereon including:
       an email analysis logic to extract and correlate attributes of a header and a body of the email with one or more lists defining attributes known to be associated with the phishing attack;
       a dynamic analysis logic including one or more virtual machines for conducting an analysis of the email by (i) providing, within a virtual machine, credential information to a web page directed to by a URL detected in the email thereby generating a POST request, (ii) determining attributes of the POST request, and (iii) correlating the attributes of the POST request with a domain indicated by information included in the body of the email; and
       a score determination logic for determining a likelihood of the email being associated with the phishing attack.

12. The apparatus of claim 11, further comprising:
    a web page analysis logic for performing a screen shot analysis of a web page directed to by the URL,
    wherein the screen shot analysis includes at least one of (i) a correlation between an image detected on the web page with one or more stored images of predetermined companies, or (ii) a correlation between text detected on the web page with stored text or a logo associated with one or more predetermined companies.

13. The apparatus of claim 12, wherein the web page analysis logic extracts and correlates information of a server delivering the web with one or more attributes extracted from the header or the body of the email.

14. A method for detecting an association of an email with a phishing attack comprising:
    receiving HyperText Markup Language (HTML) source code of a web page associated with a Uniform Resource Locator (URL) detected in the email; and
    processing the HTML source code in a virtual machine, the processing including:
       detecting a URL to a POST request on the web page,
       generating a POST request by automatically simulating submitting content in an input form detected on the web page,
       capturing the POST request and determining a target domain, the target domain being a first domain to which the POST request was transmitted, and
       determining whether the target domain is the same as a victim domain.

15. The method of claim 14 further comprising:
responsive to determining the victim domain is the same as the target domain, determining the web page is not associated with a phishing attack.

16. The method of claim 14 further comprising:
responsive to determining the victim domain is not the same as the target domain, applying at least one of a heuristic algorithm, a probabilistic algorithm or a machine learning algorithm to determine whether the web page is associate with a phishing attack.

17. The method of claim 16 further comprising:
determining a likelihood that the web page is associated with a phishing attack, wherein the determination of the likelihood is based on one or more of (i) a static analysis of the email, (ii) the determination the victim domain is not the same as the target domain, or (iii) the application of at least one of the heuristic algorithm, the probabilistic algorithm or the machine learning algorithm.

18. The method of claim 14, wherein the target domain is determined by (i) extracting a link from an image detected on the web page, and (ii) utilizing an image search application programming interface (API) to determine a domain that hosts the image.

19. The method of claim 14 further comprising:
prior to processing the HTML source code, deobfuscating the HTML source code, wherein the HTML source code was received in an obfuscated manner.

20. The method of claim 14, wherein the virtual machine is configured based on at least one of a static analysis of the email or a static analysis of the HTML source code of the web page.

\* \* \* \* \*